(12) United States Patent
Sakumoto

(10) Patent No.: US 8,370,633 B2
(45) Date of Patent: Feb. 5, 2013

(54) APPARATUS, METHOD, AND COMPUTER INSTRUCTIONS FOR GENERATING A SUBSTITUTE SIGNATURE KEY PAIR

(75) Inventor: Koichi Sakumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 12/763,245

(22) Filed: Apr. 20, 2010

(65) Prior Publication Data
US 2010/0281264 A1 Nov. 4, 2010

(30) Foreign Application Priority Data
May 1, 2009 (JP) ................................ P2009-112080

(51) Int. Cl.
H04L 9/32 (2006.01)
H04L 9/00 (2006.01)
(52) U.S. Cl. .......................................... 713/176; 380/44
(58) Field of Classification Search ................... 713/176; 380/44
See application file for complete search history.

(56) References Cited

U.S. PATENT DOCUMENTS

| | | | |
|---|---|---|---|
| 6,377,692 B1 | 4/2002 | Takahashi et al. | |
| 6,978,017 B2 * | 12/2005 | Wiener et al. | 380/30 |
| 7,139,407 B2 * | 11/2006 | Wakao | 382/100 |
| 7,159,114 B1 * | 1/2007 | Zajkowski et al. | 713/171 |
| 7,543,153 B2 * | 6/2009 | Wakao et al. | 713/180 |
| 7,664,260 B2 * | 2/2010 | Futa et al. | 380/30 |
| 7,707,420 B1 * | 4/2010 | Little | 713/176 |
| 7,917,764 B2 * | 3/2011 | Futa et al. | 713/176 |
| 2003/0110376 A1 * | 6/2003 | Wiener et al. | 713/158 |
| 2008/0089514 A1 * | 4/2008 | Futa et al. | 380/44 |
| 2008/0222418 A1 * | 9/2008 | Futa et al. | 713/176 |
| 2010/0174910 A1 * | 7/2010 | Little | 713/176 |

FOREIGN PATENT DOCUMENTS

| | | |
|---|---|---|
| EP | 0 898 260 A1 | 2/1999 |
| EP | 1 843 512 A1 | 10/2007 |
| JP | 3640785 | 1/2005 |
| WO | WO 2006/077822 A1 * | 7/2006 |

OTHER PUBLICATIONS

Koichi Sakumoto et al., "Key-Substitutable Signature and its Application to Certified Signature", URL:http://www.is.titech.ac.jp/research/research-report/C/C-250.pdf. Jan. 1, 2008, pp. 1-26.

* cited by examiner

Primary Examiner — Christian Laforgia
(74) Attorney, Agent, or Firm — Finnegan, Henderson, Farabow, Garrett & Dunner LLP

(57) ABSTRACT

An information processing apparatus includes: a signature generating section that generates an electronic signature σ by using a signature key KS associated with a verification key KV; and a substitute-key generating section that generates, with respect an electronic document m to which the electronic signature σ is attached by the signature generating section, a substitute verification key KV' (KV'≠KV) that is capable of verifying a validity of the electronic signature σ and a substitute signature key KS' (KS'≠KS) associated with the substitute verification key KV'. In a predetermined case, the verification key KV and the signature key KS are updated to the substitute verification key KV' and the substitute signature key KS'.

7 Claims, 21 Drawing Sheets

FIG. 21
(A: UNEXPOSED)
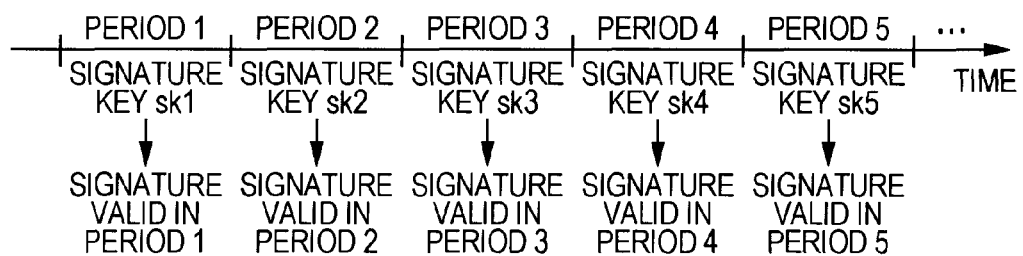
(B: EXPOSED)
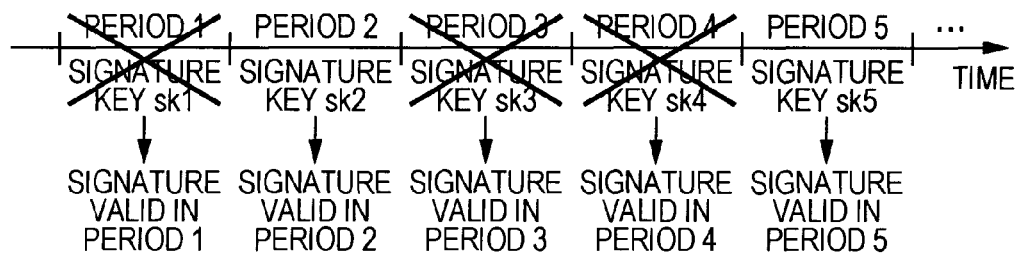
(C: SIGNATURE INVALIDATION)
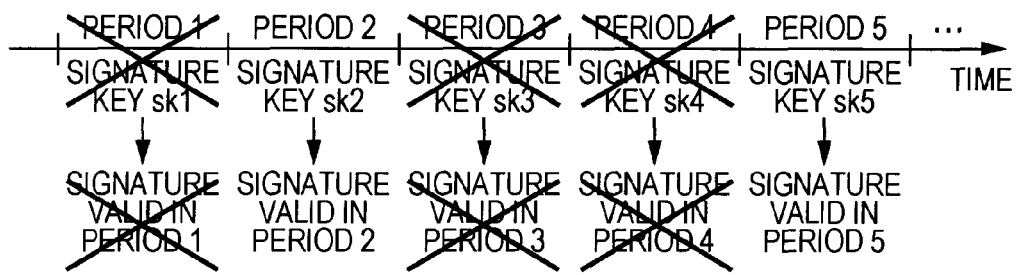

APPARATUS, METHOD, AND COMPUTER INSTRUCTIONS FOR GENERATING A SUBSTITUTE SIGNATURE KEY PAIR

BACKGROUND OF THE INVENTION

1. Field of the Invention

The present invention relates to an information processing apparatus, a key update method, and a program.

2. Description of the Related Art

Typically, creators of documents place signatures, seals, or the like (hereinafter, signatures) on the documents in order to prove the creators thereof. The signatures explicitly indicate that the signers are held responsible for the contents of the documents. For paper documents, the creators of the documents sign them manually. For electronic documents, on the other hand, it is difficult to affix stamps to the electronic documents or it is difficult for the signers to manually sign the electronic documents. Thus, a method for attaching data called an electronic signature to an electronic document is commonly used in order to uniquely identify the signer on the basis of the electronic signature. In recent years, various documents have been computerized and the electronic signatures are becoming increasingly important. Under such a situation, electronic-signature resistance to forgery becomes an issue in many cases. Although this is also true for signatures attached to paper documents, the electronic data generally calls for more caution since electronic data can be easily copied.

One example of an electronic signature scheme is the ElGamal signature scheme, which is based on the difficulty of solving the discrete logarithm problem. In the ElGamal scheme, first, a signer generates a signature key for generating an electronic signature and a verification key for verifying the validity of the electronic signature. The signer then makes the verification key publicly available. The signer generates an electronic signature by using the signature key and the electronic document and supplies the electronic signature, together with the electronic document, to a verifier. The verifier then can verify the electronic signature by using the publicly available verification key. In the case of the ElGamal signature scheme, when an attempt is made to generate the signature key or the electronic signature from the verification key, it is necessary to solve the discrete logarithm problem, which is difficult to solve computationally. This is also true for a case in which an attempt is made to generate the signature key from the electronic signature.

However, if the signature key is exposed to a third party for some reason, the third parity can freely forge the electronic signature. Thus, if the signature key is exposed, it is difficult to distinguish between the electronic signature of the true signer and an electronic signature forged by the third parity using the exposed signature key. In the case of a signature attached to an electronic document, it is possible to easily distinguish between a duplicate and the original document, but in the case of electronic data, it is difficult to distinguish between a duplicate and the original document since they are identical. Therefore, measures for invalidating the electronic signature, the signature key, and the verification key are taken at the stage when the signature-key exposure is found out. In this case, the electronic document to which the electronic signature is attached is virtually invalidated as well.

Various systems have been conceived in order to reduce damages resulting from such signature-key exposure. For example, Japanese Patent No. 3640785 discloses a method in which a validity period is set for each signature key and the signature key whose validity period is expired is revoked (see FIG. 21). With the method, if a signature key is exposed, signature keys associated with periods before and after the period associated with the exposed key can be kept valid. Thus, it is not necessary to invalidate an electronic signature generated in a period other than the period associated with the exposed signature key and an electronic document to which the electronic signature is attached. As a result, it is possible to reduce the amount of electronic documents to be invalidated.

SUMMARY OF THE INVENTION

However, even when the technology disclosed in Japanese Patent No. 3640785 is used, all of electronic signatures generated with the exposed signature key are invalidated and virtually all of electronic documents to which the electronic signatures are attached become invalid. Naturally, when a signature key is to be invalidated for some reason even without exposure thereof, a corresponding electronic document is also to be invalidated. As described above, the role of electronic signatures is the same as signatures placed on paper documents. Thus, even for an electronic document, there are cases in which it is not easy to have an electronic signature attached to the electronic document again, depending on the type of document. Thus, it is very important to strictly manage the electronic signatures against exposure thereof so that the electronic signatures are not rendered invalid. It is, however, difficult to ensure that absolutely no exposure of the signature keys occurs.

Accordingly, the present invention has been made in view of the foregoing problems, and it is desirable to provide a novel and improved information processing apparatus, a key update method, and a program which are capable of updating, even when a signature key used for generating an electronic signature is exposed, the signature key and a verification key without invalidating the electronic signature.

In order to overcome the forgoing problems, an information processing apparatus according to one embodiment of the present invention includes: a signature generating section that generates an electronic signature σ by using a signature key KS associated with a verification key KV; and a substitute-key generating section that generates, with respect an electronic document m to which the electronic signature σ is attached by the signature generation section, a substitute verification key KV' (KV'≠KV) that is capable of verifying a validity of the electronic signature σ and a substitute signature key KS' (KS'≠KS) associated with the substitute verification key KV'. In a predetermined case, the verification key KV and the signature key KS are updated to the substitute verification key KV' and the substitute signature key KS'.

When the signature generating section generates N electronic signatures $\sigma_j$ (j=1, ..., N, and N≧2) with respect to N electronic documents $m_j$, the substitute-key generating section may generate the substitute verification key KV' that is capable of verifying the validity of the electronic signatures with respect to M combinations (2≦M≦N) of the N combinations ($m_j$, $\sigma_j$) of the electronic documents and the electronic signatures and the substitute signature key KS' associated with the substitute verification key KV'.

When the signature key KS is exposed or when a predetermined period passes, the substitute-key generating section may generate the substitute verification key KV' and the substitute signature key KS' to update the verification key KV and the signature key KS to the substitute verification key KV' and the substitute signature key KS'.

When the substitute signature key KS' is exposed or when a predetermined period passes, the substitute-key generating section may generate a substitute verification key KV" (KV"≠KV', KV"≠KV) and a substitute signature key KS" (KS"≠KS', KS"≠KS) to update the substitute verification key KV' and the substitute signature key KS' to the substitute verification key KV" and the substitute signature key KS".

The substitute-key generating section may further includes: a first-element selector that arbitrarily selects first elements to be contained in the substitute signature key KS'; a second-element determiner that determines second elements to be contained in the substitute verification key KV', by using the first elements; an element calculator that determines a solution to an equation in which elements contained in a verification equation for verifying the validity of the electronic signature σ by using the verification key KV, the elements being associated with the first and second elements and being contained in the verification key KV and the signature key KS, are replaced with the first and second elements and elements unassociated with the first and second elements and contained in the verification key KV and the signature key KS are unknown; and a substitute-key determiner that determines the substitute signature key KS' containing at least the first elements selected by the first element selector and the substitute signature key KV' containing at least the second elements selected by the second-element selector and a result of the determination performed by the element calculator.

The verification equation may be expressed by:

$$g^u = y^{r*\alpha} * r^{v*s} \bmod p \text{ (p is a prime number),}$$

where r and s denote two parameters contained in the electronic signature σ, y denotes a parameter regarding the electronic document m and the elements associated with the second elements and contained in the verification key KV, α denotes an element associated with the result of the determination performed by the element calculator and contained in the verification key KV, and u denotes a hash value for the electronic document m and the parameters r and y.

A key update method according to another embodiment of the present invention includes the steps of: generating an electronic signature σ by using a signature key KS associated with a verification key KV; generating, with respect an electronic document m to which the electronic signature σ is attached in the signature generating step, a substitute verification key KV' (KV'≠KV) that is capable of verifying a validity of the electronic signature σ and a substitute signature key KS' (KS'≠KS) associated with the substitute verification key KV'; and updating, in a predetermined case, the verification key KV and the signature key KS to the substitute verification key KV' and the substitute signature key KS' generated in the substitute-key generating step.

A program according to still another embodiment of the present invention causes a computer to realize: a signature generating function that generates an electronic signature σ by using a signature key KS associated with a verification key KV; a substitute-key generating function that generates, with respect an electronic document m to which the electronic signature σ is attached by the signature generating function, a substitute verification key KV' (KV'≠KV) that is capable of verifying a validity of the electronic signature σ and a substitute signature key KS' (KS'≠KS) associated with the substitute verification key KV'; and an update function that updates, in a predetermined case, the verification key KV and the signature key KS to the substitute verification key KV' and the substitute signature key KS' generated by the substitute-key generating function.

As described above, according to the present invention, even when a signature key used for generating an electronic signature is exposed, it is possible to update the signature key and a verification key without invalidating the electronic signature.

BRIEF DESCRIPTION OF THE DRAWINGS

FIG. 21 is a diagram schematically illustrating a key update method according to a time-limited electronic signature scheme.

DESCRIPTION OF THE PREFERRED EMBODIMENTS

Figure 1:
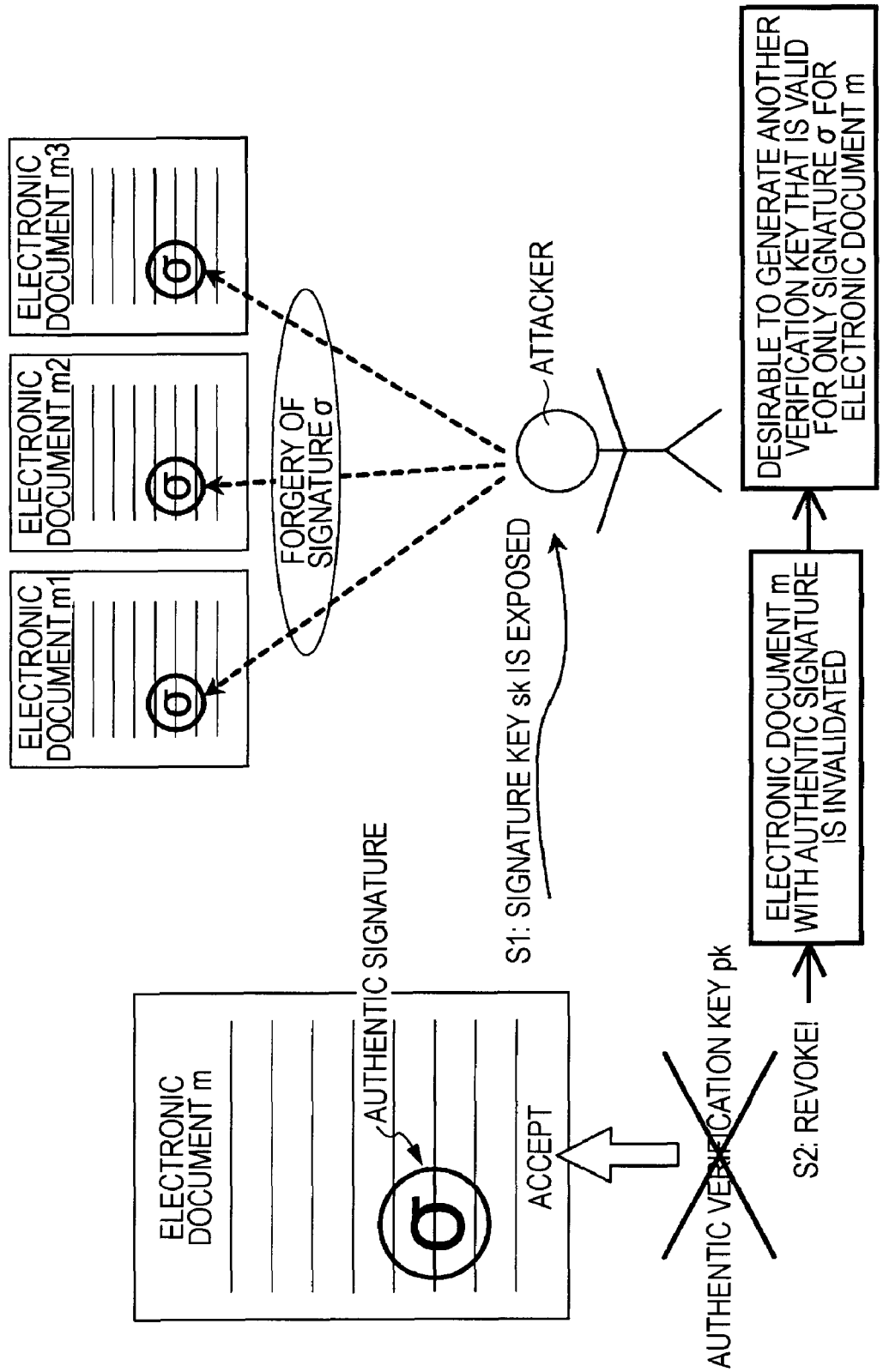
FIG. 1 is a diagram schematically illustrating a problem that occurs when a signature key for generating an electronic signature is exposed.

A preferred embodiment of the present invention will be described below in detail with reference to the accompanying drawings. Herein and in the drawings, elements having substantially the same functional configurations are denoted by the same reference numerals, and redundant descriptions are not given.

[Flow of Description]

The flow of description given below with respect to the embodiment of the present invention will now be described briefly. A problem that occurs when a signature key is exposed in an electronic signature scheme is briefly described first with reference to FIG. 1. In addition, a typical countermeasure against exposure of a signature key is briefly described with reference to FIG. 21 and a problem of the countermeasure is discussed. Next, characteristics of a substitute key used in a key update method according to the embodiment are described with reference to FIG. 2.

In addition, with reference to FIGS. 3 to 9, a substitute-key generation method is described in detail in conjunction with an example of a scheme (hereinafter referred to as an "SC08 scheme") reported by Koichi Sakumoto and Keisuke Tanaka, "Key-Substitutable Signature", The 2008 Symposium on Cryptography and Information Security, Miyazaki, Japan, Jan. 22-25, 2008.

The substitute-key generation method used in the key update method according to the embodiment is a method that takes an innovative approach in order for application to the key update system in the SC08 scheme. Thus, although the substitute-key generation method according to the embodiment is different from the SC08 scheme, the concept thereof is helpful for better understanding of the technical contents of the embodiment and is thus described in detail.

Thereafter, a key-substitutable electronic signature scheme according to the embodiment and the configuration of a key update system thereof are described in detail with reference to FIGS. 10 to 16. An example of the configuration of entities included in the key update system according to the embodiment is first described with reference to FIG. 10. Thereafter, a procedure performed by a signer and a verifier is described with reference to FIG. 11. Subsequently, differences between the key update method according to the embodiment and other key update methods are described with reference to FIG. 12 while comparing the schemes.

Figure 13:
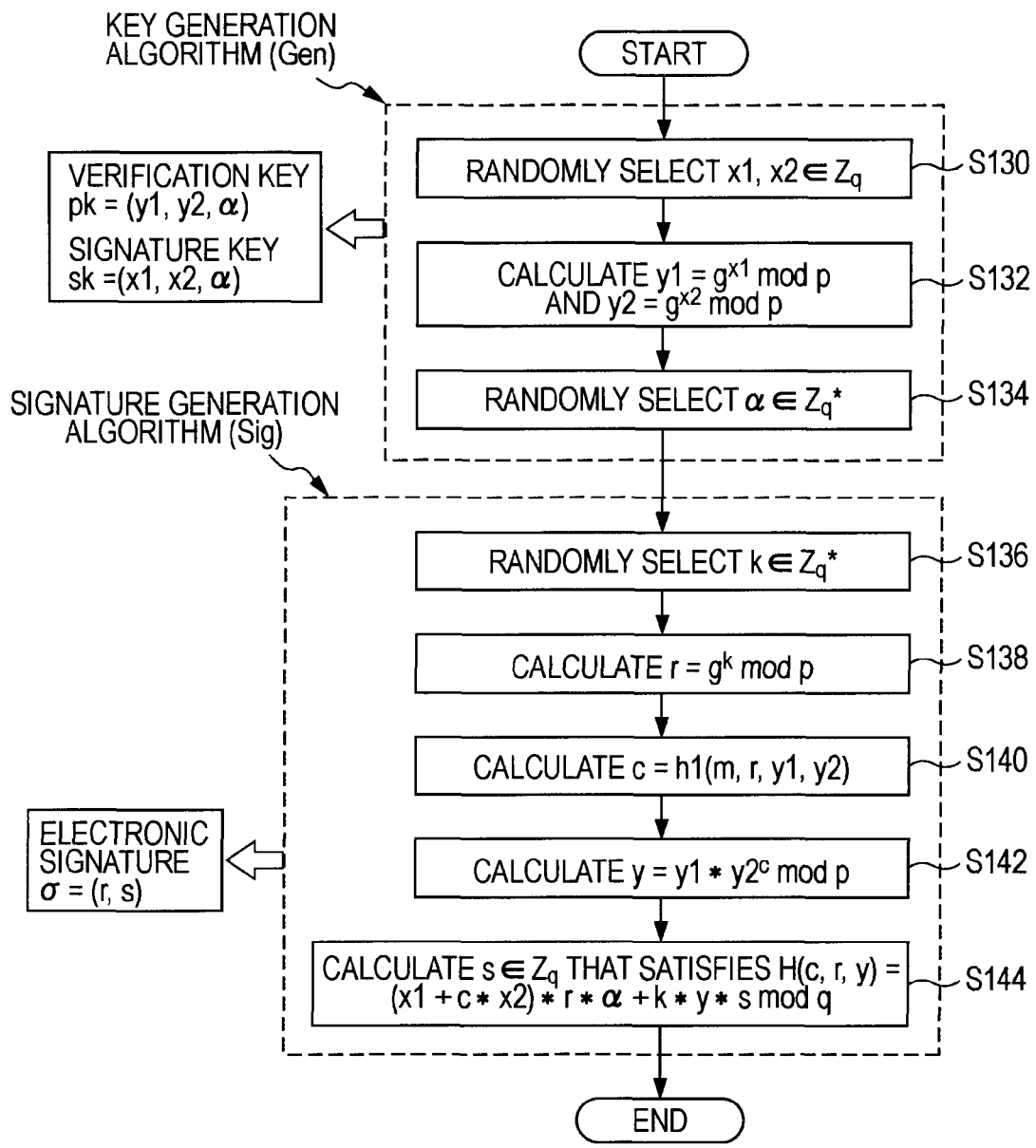
FIG. 13 is a flow diagram illustrating an electronic-signature generation method according to the embodiment.
Figure 14:
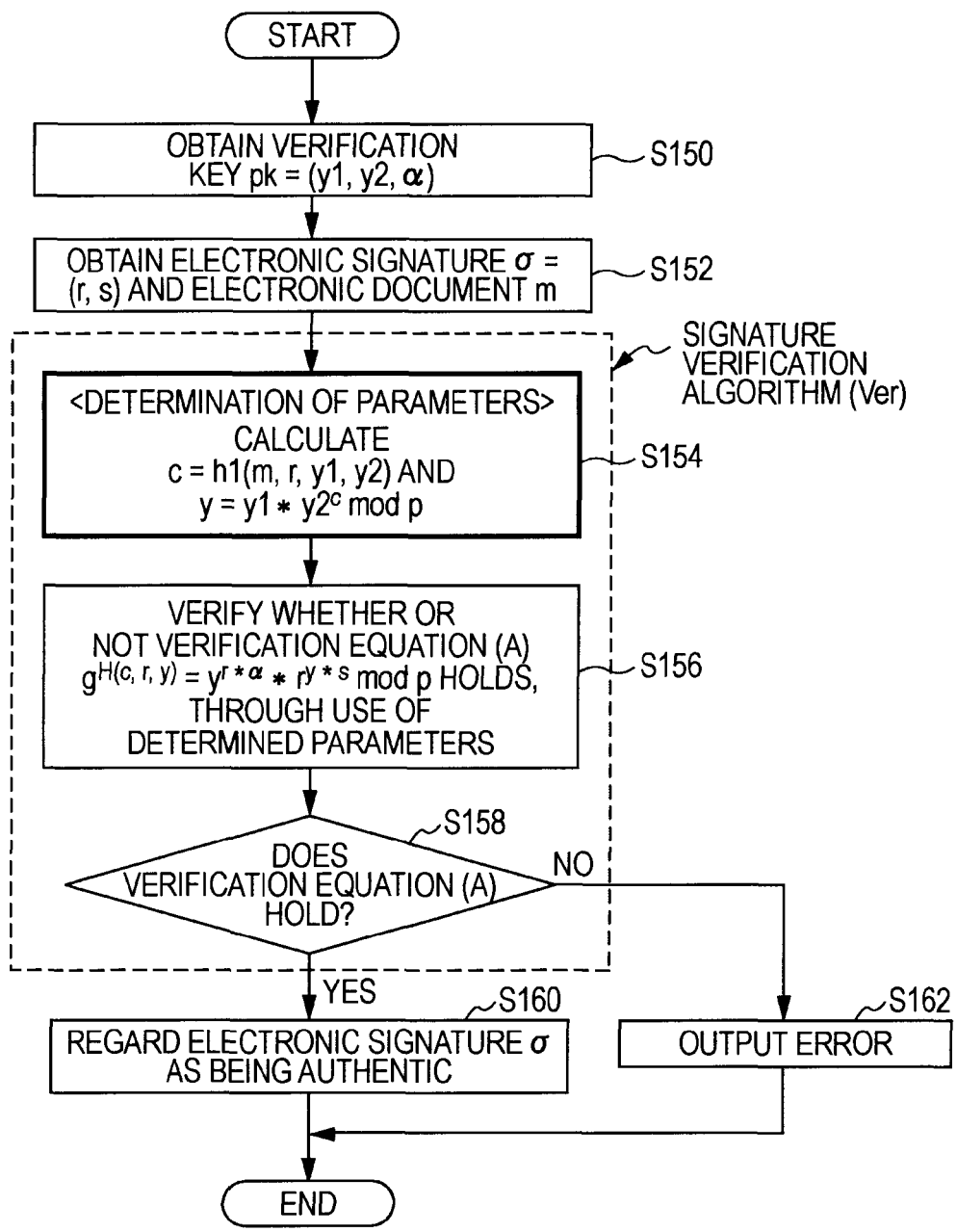
FIG. 14 is a flow diagram illustrating an electronic-signature verification method according to the embodiment.
Figure 15:
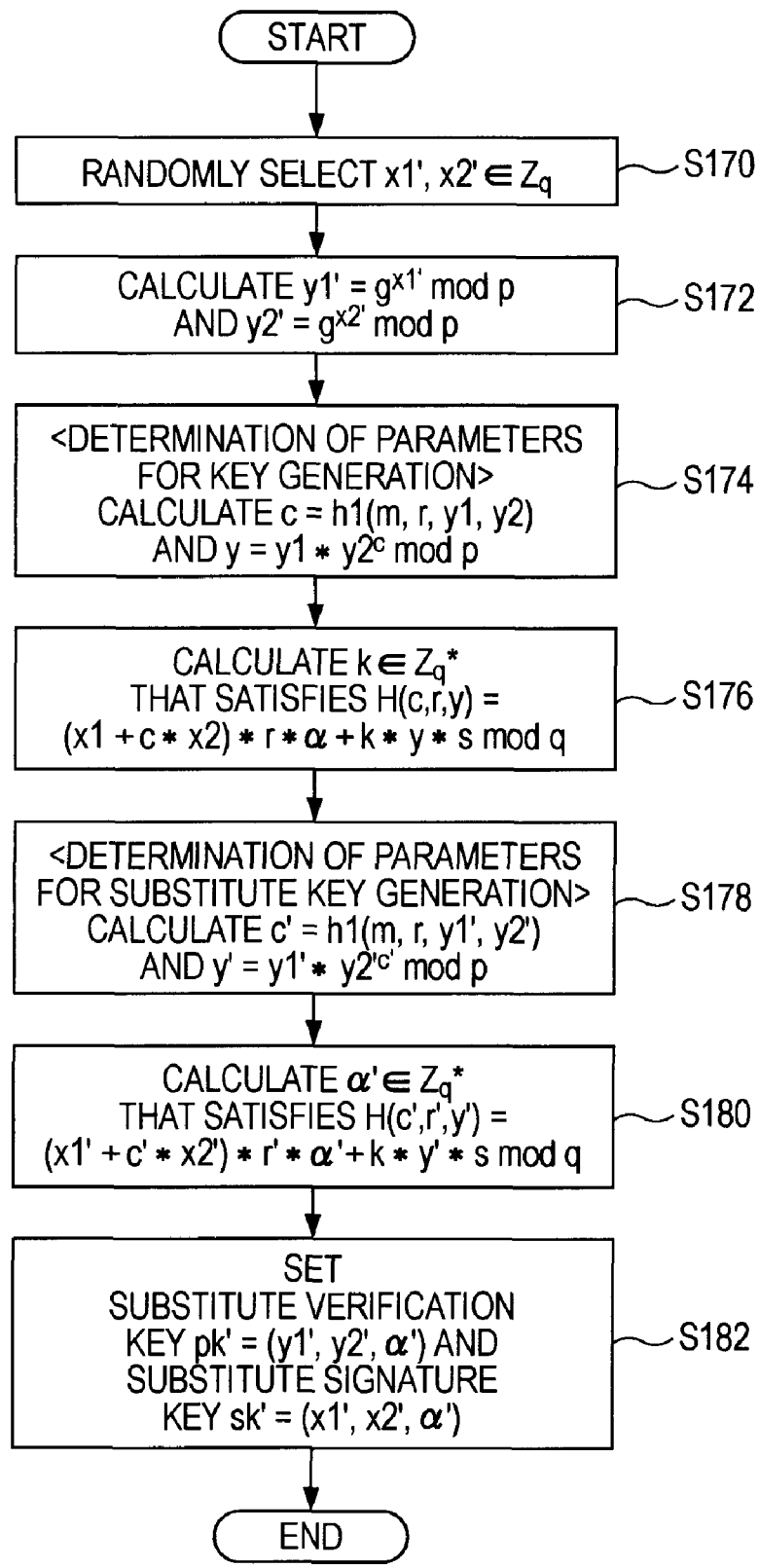
FIG. 15 is a flow diagram illustrating details of a substitute-key generation method according to the embodiment.

Subsequently, specific algorithms for the key-substitutable electronic signature scheme according to the embodiment are described with reference to FIGS. 13 to 15.

Figure 16:
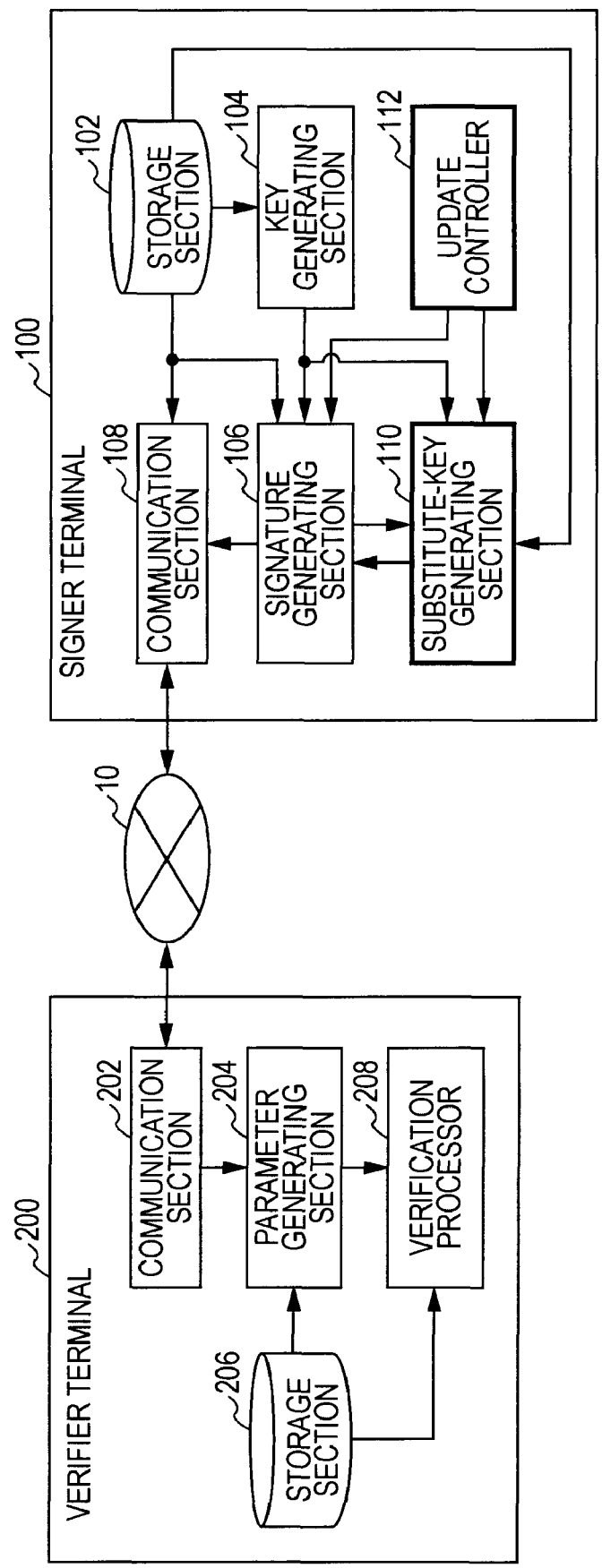
FIG. 16 is a diagram illustrating an example of the configuration of a key update system according to the embodiment and an example of the functional configurations of a signer terminal and a verifier terminal.

Thereafter, the system configuration of the key update system according to the embodiment and the functional configurations of a signer terminal and a verifier terminal are described with reference to FIG. 16. Next, one example of an extension of the key update method according to the embodiment is described with reference to FIGS. 17 to 19. In conjunction with the extended method, a method for generating a substitute key for multiple pairs (of electronic signatures and electronic documents) is described. Subsequently, an example of the hardware configuration of the signer terminal and the verifier terminal according to the embodiment is described with reference to FIG. 20.

DESCRIPTION CONTENTS

<1. Embodiment>
  1-1: Exposure of Signature Key
  1-2: Time-limited Signature Scheme
  1-3: SC08 Scheme
    1-3-1: System Configuration
    1-3-2: Substitute-Key Generation Method
    1-3-3: Algorithms
  1-4: Present Scheme
    1-4-1: System Configuration
    1-4-2: Key Update Method Comparison
    1-4-3: Algorithms
    1-4-4: Functional Configurations of Terminals
  1-5: Extended Scheme
    1-5-1: Algorithms
  1-6: Example of Hardware Configuration of Terminals <1. Embodiment>

An embodiment of the present invention will now be described. The embodiment is directed to a scheme (hereinafter referred to as a "present scheme") for updating, even when a signature key used for an electronic signature is exposed, the signature key to another signature key without invalidating an electronic signature previously generated with the signature key. In other words, with the present scheme, even when the exposed signature key is revoked, the electronic document previously signed using the signature key is kept valid. The present scheme will be described below.

[1-1: Exposure of Signature Key]

First, exposure of an electronic key will be briefly described with reference to FIG. 1. FIG. 1 schematically illustrates a problem that occurs when a signature key sk for generating an electronic signature σ attached to an electronic document m is exposed.

As illustrated in FIG. 1, the authentic electronic signature σ attached to the electronic document m by using the signature key sk can be verified using an authentic verification key pk paired with the signature key sk. The verification key pk is made publicly available. The verification of the authentic electronic signature σ uses a predetermined verification equation. That is, a verifier verifies the validity of the electronic signature σ by inputting information of the electronic document m, the electronic signature σ, and the verification key pk to the predetermined verification equation and determining whether or not the predetermined verification equation holds. A case in which it is determined that the electronic signature a for the electronic document m is an authentic electronic signature with respect to the verification key pk in the manner described above is referred to as "the verification key pk accepting a pair (m, σ) of the electronic document m and the electronic signature σ".

The signature key sk is managed in secret by the signer and is not generally known to other people. Needless to say, the signer manages the signature key sk so that it is not known to even the verifier. It is, however, difficult to ensure that absolutely no exposure of the signature key sk occurs. For example, an event in which a terminal used by the signer is attacked to thereby cause leakage of the information of the signature key sk stored in the terminal is also highly likely. When the signature key sk is exposed to another person (hereinafter referred to as an "attacker") for some reason (in step S1), the attacker can attach the electronic signature σ to an arbitrary document. In other words, the attacker can forge the electronic signature σ.

A case in which the attacker uses the exposed signature key sk to attach the electronic signature σ to an electronic document m1 will now be discussed by way of example. In this case, since the electronic signature σ attached to the electronic document m1 is a signature generated with the authentic signature key sk, the electronic signature σ is accepted by the verification key pk. That is, the electronic signature σ is accepted as a signature of an authentic signer, although it is a signature generated by the attacker. For example, when the electronic document m1 is a real estate sales contract, there is a possibility that the real estate owned by the authentic signer is sold without his/her permission before he or she notices.

Accordingly, when the exposure of the signature key sk is found out, the authentic signer invalidates the signature key sk (in step S2). When the signature key sk is invalidated, the revivification key pk paired with the signature key sk also becomes invalid. In addition, the electronic signature σ generated with the signature key sk becomes invalid. For example, in a case in which the electronic document m is a contract, when the electronic signature σ becomes invalid, the contract agreed upon using the electronic document m becomes invalid. When the electronic document m is a low-importance document such as an in-house document, an electronic signature σ' might be attached thereto again using a newly generated signature key sk'. However, when the electronic document m is an important document such as a contract agreed with a third party, an electronic signature σ' may not easily be re-attached thereto in many cases.

In view of such a situation, the present inventor conceived the idea of generating another verification key pk' that accepts only the electronic signature σ previously attached to the electronic document m by the authentic signer without accepting the electronic signature σ forged by the attacker. Various measures have been taken so far to deal with the problem of the previously generated electronic signature σ becoming invalid as a consequence of exposure of the signature key sk. Many of such measures, however, are aimed to reduce influences of the electronic signature σ invalidation as a consequence of the exposure of the signature key sk and do not provide means for saving the electronic signature σ to be invalidated. A time-limited signature scheme will now be introduced as one example of measures against the exposure of the signature key sk.

[1-2: Time-Limited Signature System]

The time-limited signature scheme is a scheme as illustrated in FIG. 21. In this scheme, a signature key sk is updated in each predetermined period. A verification key pk, on the other hand, stays the same in all periods. For example, in period 1, a signature key sk1 is used and an electronic signature that is valid in only period 1 is generated. When the time passes and reaches period 2, a signature key sk2 that is valid in only period 2 is used to generate an electronic signature that is valid in only period 2. In the case of this scheme, if the signature key sk1 is used to generate an electronic signature in period 2, this electronic signature is not accepted by the verification key pk.

Thus, if signature keys sk1, sk3, and sk4 are exposed as in case B in FIG. 21 and electronic signatures in periods 1, 3, and 4 are invalidated as in case C, electronic signatures in periods 2, 5, ... are kept valid. Therefore, electronic documents with the electronic signatures generated using the signature keys sk2, sk5, ... in periods 2, 5, ... do not have to be invalidated. However, electronic documents with the electronic signatures generated in periods 1, 3, and 4 are rendered invalid. This scheme, therefore, does not provide a fundamental solution to the above-described problem. In order to solve the above-described problem, it is still necessary to provide means for saving the electronic signature σ generated with the signature key sk before the exposure.

[1-3: SC08 Scheme]

As described above, the present scheme relates to a method in which another signature key sk' (hereinafter referred to as a substitute signature key sk') that accepts a pair of the electronic document m and the electronic signature σ generated before exposure by the signer using a signature key sk is used to revoke the exposed signature key sk without invalidating the electronic document m and the electronic signature σ. In other words, the present scheme relates to a method for updating the exposed signature key sk to the substitute signature key sk'. A method for generating a substitute signature key sk' used for a key update scheme like the present scheme and a verification key pk' (hereinafter, a substitute verification key pk') paired with the substitute signature key sk' is not currently available. However, with respect to a concept of a substitute signature key sk' and a substitute verification key pk' (hereinafter may be referred to as "substitute keys"), a report on the findings (the SC08 scheme) made by Sakumoto and Tanaka is available. Hence, the SC08 scheme will be described prior to a detailed description of the present scheme.

(Characteristics of Substitute Verification Key pk')

Figure 2:
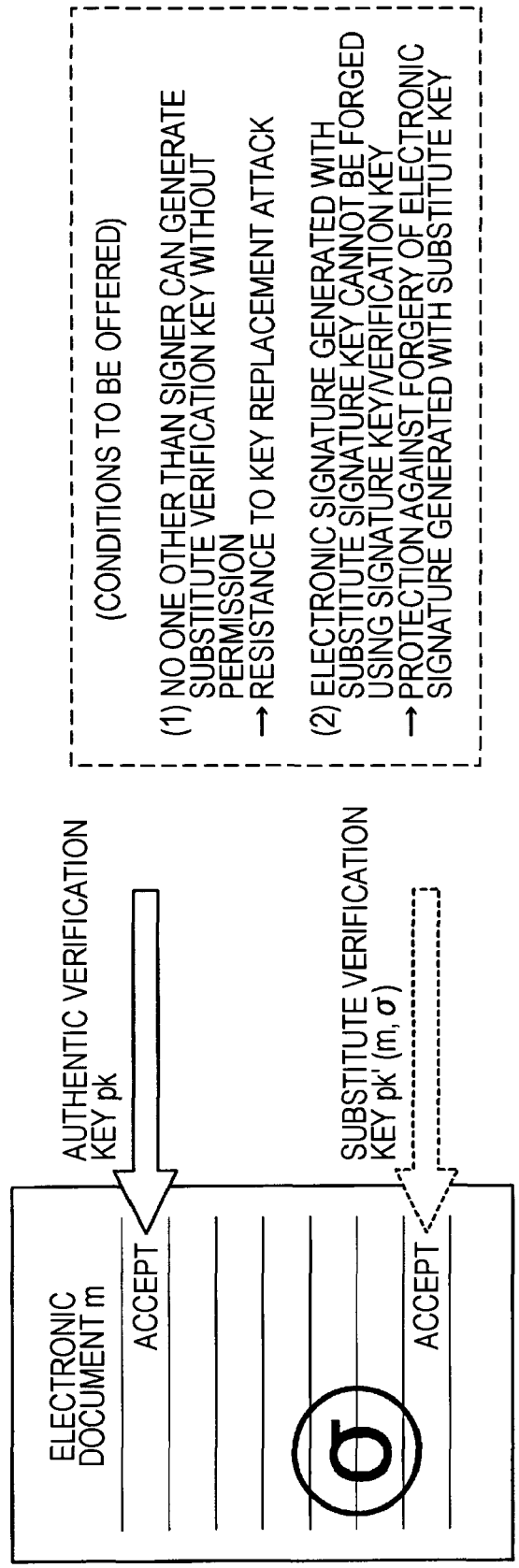
FIG. 2 is a diagram illustrating characteristics of a substitute verification key.

Characteristics of the substitute verification key pk' will be briefly described first with reference to FIG. 2. As described above, the substitute verification key pk' is a key for accepting an electronic signature σ generated with a signature key sk and an electronic document m to which the electronic signature σ is attached. Thus, the substitute verification key pk' is generated with respect to a pair of the electronic document m and the electronic signature σ. Naturally, the substitute verification key pk' is different from the verification key pk paired with the signature key sk.

The substitute verification key pk' bears at least the following conditions: (1) no one other than a signer can generate the substitute verification key pk' without permission, and (2) an electronic signature σ' generated with the substitute signature key sk' paired with the substitute verification key pk' is not forged with the signature key sk and the verification key pk. Condition (1) provides resistance to a key-replacement attack. Condition (2) makes it possible to prevent forgery of the electronic signature σ' generated with the substitute signature key sk'. In the SC08 scheme, a scheme for generating such a substitute key is proposed.

(1-3-1: System Configuration)

Figure 3:
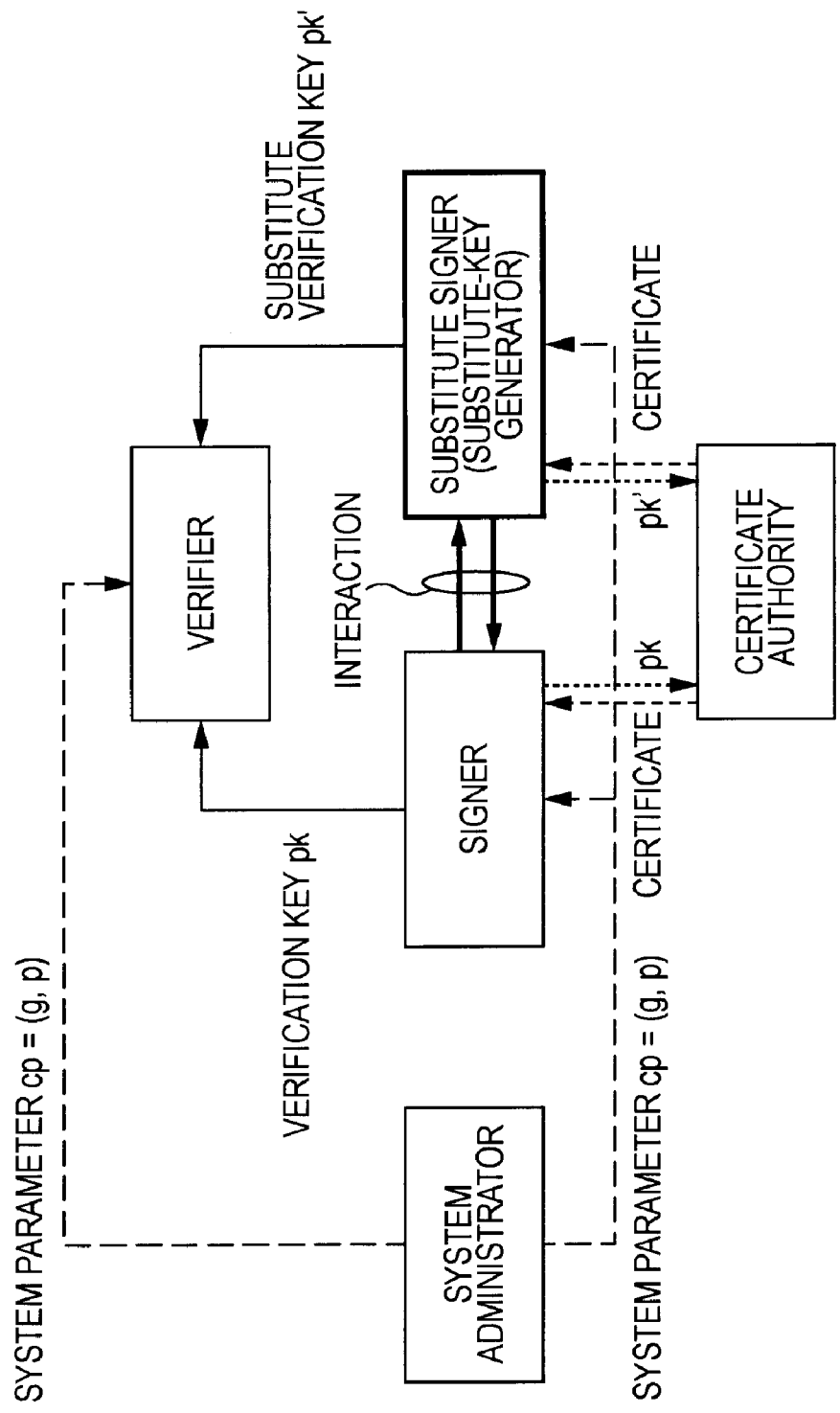
FIG. 3 is a diagram illustrating one example of the configuration of entities in an SC08 scheme, which is one example of a key-substitutable electronic signature system.

In the SC08 scheme, five entities are envisioned as models in an electronic signature system. As illustrated in FIG. 3, the five entities envisioned in the SC08 scheme are a system administrator, a signer, a verifier, a certificate authority, and a substitute signer (hereinafter referred to as a "substitute-key generator"). The system administrator is an entity for generating a system parameter cp by using a system-parameter generation algorithm (SetupKSS). The signer is an entity for generating a signature key sk unique to the signer and a verification key pk paired with the signature key sk by using a key generation algorithm (GenKSS). The signer also generates an electronic signature σ for an electronic document m by using a signature generation algorithm (SigKSS).

The verifier is an entity for verifying the validity of the electronic signature σ attached to the electronic document m by using a signature verification algorithm (VerKSS). The substitute-key generator is an entity for generating a substitute signature key sk' and a substitute verification key pk' paired with the substitute signature key sk' by using a substitute-key generation algorithm <ORG(sk), SUB>. During generation of the substitute keys for the electronic document m and the electronic signature σ attached to the electronic document m, the substitute-key generator generates the substitute keys while interacting with the signer who is the generator of the electronic signature σ attached to the electronic document m. The certificate authority is an entity for issuing a certificate for guaranteeing the validity of the verification key generated by the signer or the substitute verification key generated by the substitute-key generator.

Figure 4:
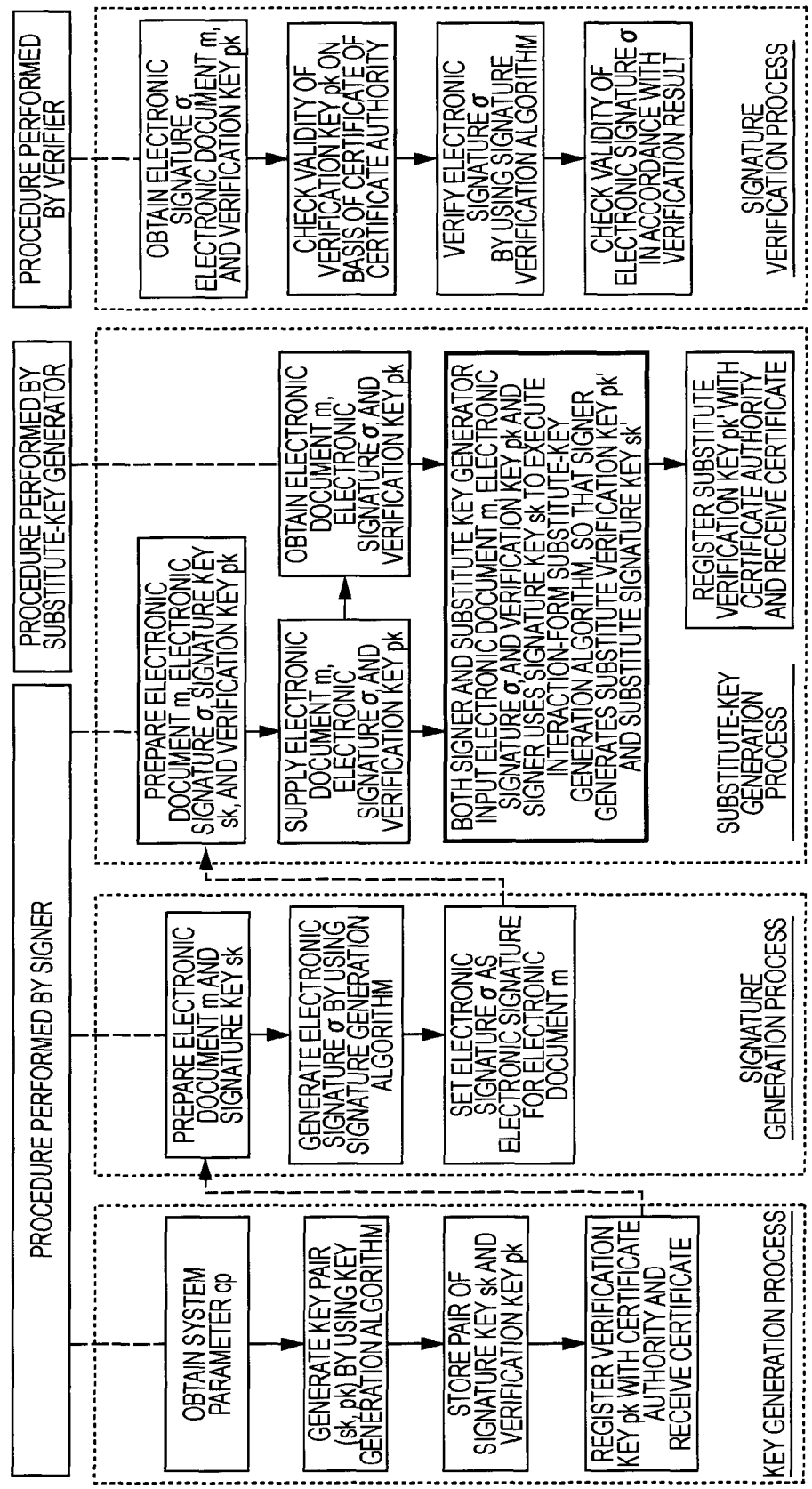
FIG. 4 is a flow diagram illustrating a substitute-key generation method, an electronic-signature generation method, and an electronic-signature verification method in the SC08 scheme.

By executing a procedure as illustrated in FIG. 4, those entities generate the signature key sk, the verification key pk, the electronic signature σ, the substitute signature key sk', and the substitute verification key pk' and verify the electronic signature σ. It is assumed that the system administer has already generated the system parameter cp by using the system-parameter generation algorithm (SetupKSS). Generation of the system parameter cp by using SetupKSS is expressed as:

$$cp = \text{Setup}KSS(1^\lambda) \quad (1)$$

where $1^\lambda$ denotes a security parameter.
(Key Generation Process by Signer)

A key generation procedure performed by the signer will be described first. As illustrated in FIG. 4, in a key generation process, the signer obtains the system parameter cp from the system administrator. Subsequently, the signer inputs the system parameter cp to the key generation algorithm (GenKSS) to generate a pair of a signature key sk and a verification key pk. Generation of (sk, pk) by using GenKSS is expressed as:

$$(sk, pk) = \text{Gen}KSS(cp) \quad (2)$$

When the signature key sk and the verification key pk are generated using the key generation algorithm (GenKSS), the signer stores the pair of the generated signature key sk and verification key pk. The signer registers, as his/her verification key, the verification key pk with the certificate authority and receives a certificate thereof, as appropriate.
(Signature Generation Process by Signer)

A signature generation procedure performed by the signer will be described next. As illustrated in FIG. 4, the signer prepares an electronic document m to be signed and the stored signature key sk. The signer then inputs the signature key sk and the electronic document m to the signature generation algorithm (SigKSS) to generate an electronic signature σ. Generation of the electronic signature σ by using SigKSS is expressed as:

$$\sigma = \text{Sig}KSS(sk, m) \quad (3)$$

The signer sets the electronic signature σ (the algorithm output value), generated by equation (3), as the electronic signature σ for the electronic document m.
(Substitute-Key Generation Process by Signer and Substitute Key Generator)

Next, a description will be given of an overview of a substitute-key generation procedure performed by a cooperation of the signer and the substitute-key generator. Details of a substitute-key generation method are described below. First, the signer prepares the electronic document m, the electronic signature σ, the signature key sk used for generating the electronic signature σ, and the verification key pk paired with the signature key sk. The signer then supplies the prepared electronic document m, electronic signature σ, and verification key pk to the substitute-key generator. The substitute-key generator obtains the electronic document m, the electronic signature σ, and the verification key pk from the signer.

Subsequently, the signer and the substitute-key generator input, as common parameters, the verification key pk, the electronic document m, and the electronic signature σ to the substitute-key generation algorithm <ORG(sk), SUB>. In addition, through interaction with the substitute-key generator, the signer supplies, to the substitute-key generator, information that enables the substitute-key generator to generate substitute keys by using information of the signature key sk. The substitute-key generator then generates a substitute verification key pk', which is to accept the electronic document m and the electronic signature σ, and a substitute signature key sk' paired with substitute verification key pk'.

Generation of sk' and pk' by using <ORG(sk), SUB> is expressed as:

$$(sk', pk') = \langle \text{ORG}(sk), \text{SUB} \rangle (pk, m, \sigma) \quad (4)$$

where ORG represents the signer and SUB represents the substitute-key generator. That is, ORG(sk) indicates that the signer uses the signature key sk in the substitute-key generation algorithm. The signature key sk, however, is not disclosed to the substitute-key generator SUB and is used by the signer ORG to perform a closed computation, and only the result of the computation is supplied to the substitute-key generator. Details of the processing are described below. When the substitute signature key sk' and the substitute verification key pk' are generated based on equation (4) noted above, the substitute-key generator registers, as his/her verification key, the substitute verification key pk' with the certificate authority and receives a certificate thereof, as appropriate.
(Signature Verification Process by Verifier)

A procedure performed by the verifier will be described next. The verifier first obtains the electronic signature σ, the electronic document m, and the verification key pk from the signer. Next, on the basis of the certificate of the certificate authority, the verifier checks whether or not the verification key pk is truly the verification key of the signer, as appropriate. The verifier then inputs the verification key pk, the electronic document m, and the electronic signature σ to the signature verification algorithm (VerKSS) to determine whether a verification result $v_{out}$ is 0 (error) or 1 (accept). Determination of the verification result $v_{out}$ by using VerKSS is expressed as:

$$v_{out} = \text{Ver}KSS(pk, m, \sigma) \quad (5)$$

In accordance with the verification result $v_{out}$ determined based on equation (5), the verifier accepts (σ, m) for $v_{out}=1$ and rejects (σ, m) for $v_{out}=0$. The same applies to a case in which a verification procedure is performed using the substitute verification key pk'.

As described above, in the SC08 scheme, the signer and the substitute-key generator interact with each other to generate the substitute verification key pk' that is to accept the electronic signature σ generated with the signature key sk and attached to the electronic document m. The SC08 scheme was not originally conceived in order to realize a key update method, but is a technology for enabling an entity (the substitute-key generator) different from the signer to generate a substitute key in a secure manner. In the SC08 scheme, an interaction with the true signer is a requirement for generating the substitute key, in order to prevent the substitute key from being generated without permission. Thus, the substitute-key generation process employs the interaction-based scheme in which an innovative approach is taken with respect to various types of input information, as described above. The substitute-key generation method will be described below in detail in conjunction with a more specific example.
(1-3-2: Substitute-Key Generation Method)

Figure 5:
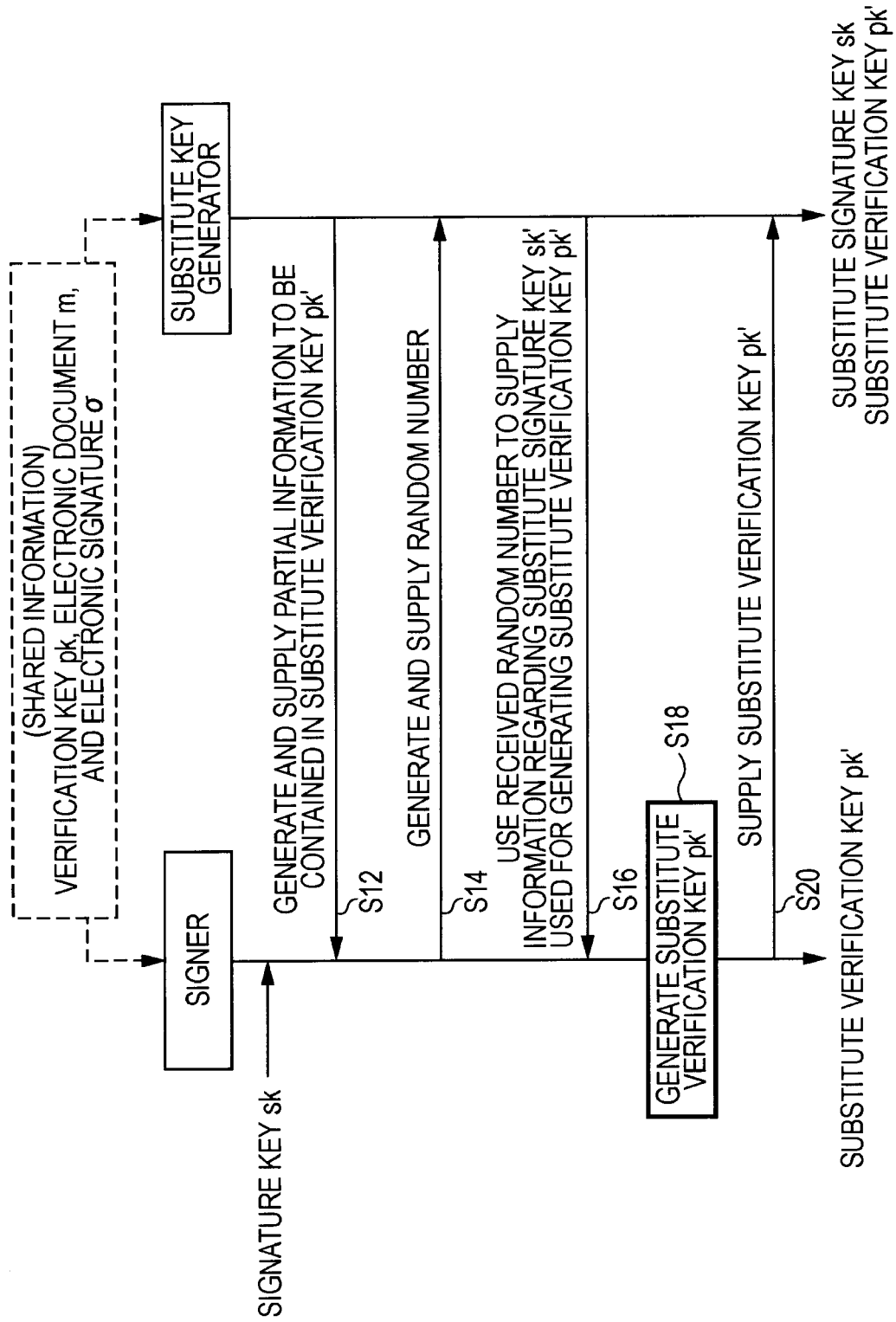
FIG. 5 is a flow diagram illustrating a flow of the substitute-key generation method in the SC08 scheme.

Reference is first made to FIG. 5. FIG. 5 is a diagram illustrating a general flow of processing in the substitute-key generation algorithm <ORG(sk), SUB> in the SC08 scheme. As illustrated in FIG. 5, it is assumed that a verification key pk, an electronic document m, and an electronic signature σ have been input to both the signer and the substitute-key generator as shared information. The signer also uses a signature key sk. It is, however, to be noted that the signature key sk is not supplied to the substitute-key generator in order to prevent the substitute-key generator from forging the electronic signature of the signer.

The substitute-key generator generates a substitute signature key sk' and uses the information for the substitute signature key sk' to generate partial information of a substitute verification key pk'. As described above, the substitute verification key pk' is to accept the electronic signature σ generated with the signature key sk. Thus, the substitute-key generator who does not know the information of the signature key sk does not generate the substitute verification key pk' without acquiring the information of the signature key sk. The substitute verification key pk' is also to accept an electronic signature σ' (σ'≠σ) generated with the substitute signature key sk'. Therefore, the substitute verification key pk' has to contain information regarding the substitute signature key sk'. For such a reason, partial information to be contained in the substitute verification key pk' is generated by the substitute-key generator, as described above.

The partial information to be contained in the substitute verification key pk' generated by the substitute-key generator is supplied from the substitute-key generator to the signer (in step S12). Upon receiving the partial information for the substitute verification key pk', the signer generates a random number and supplies the random number to the substitute-key generator (in step S14). Upon receiving the random number from the signer, the substitute-key generator uses the received random number to supply, to the signer, information of the substitute signature key sk' used for generating the substitute verification key pk' (in step S16). As described above, the substitute verification key pk' is also to accept the electronic signature α' generated with the substitute signature key sk'. Thus, information regarding the substitute signature key sk' has to be supplied to the signer.

If, however, the substitute signature key sk' is known to the signer, the electronic signature σ' generated with the substitute signature key sk' can be utilized without permission. Accordingly, through the use of the random number, the substitute-key generator supplies, to the signer, information regarding the substitute signature key sk' in such a form that the substitute signature key sk' is not identified by the signer and the substitute verification key pk' can be generated. Upon receiving such information regarding the substitute signature key sk', the signer generates the substitute verification key pk' (in step S18). Thereafter, the signer supplies the generated substitute verification key pk' to the substitute-key generator (in step S20). That is, although the substitute-key generator is referred to as such in the SC08 scheme, virtually the signer generates the substitute verification key pk'.

The substitute signature key sk' and the substitute verification key pk' are generated by the method described above. A general flow of the substitute-key generation processing in the SC08 scheme has been described thus far with reference to FIG. 5. In the above description, however, no specific description has been given of a computation method. Hence, specific computation algorithms for realizing the contents of the processing steps illustrated in FIG. 5 will be described below in detail.

(1-3-3: Algorithms)

Prior to description of specific computations for the substitute-key generation algorithm, a description is given of a system-parameter generation algorithm, a key generation algorithm, a signature generation algorithm, and a signature verification algorithm in the SC08 scheme. These algorisms are correlated with each other and contain an element that is used for realizing the substitute-key generation algorithm and that is characteristic of the SC08 scheme.

(System-Parameter Generation Algorithm)

Figure 6:
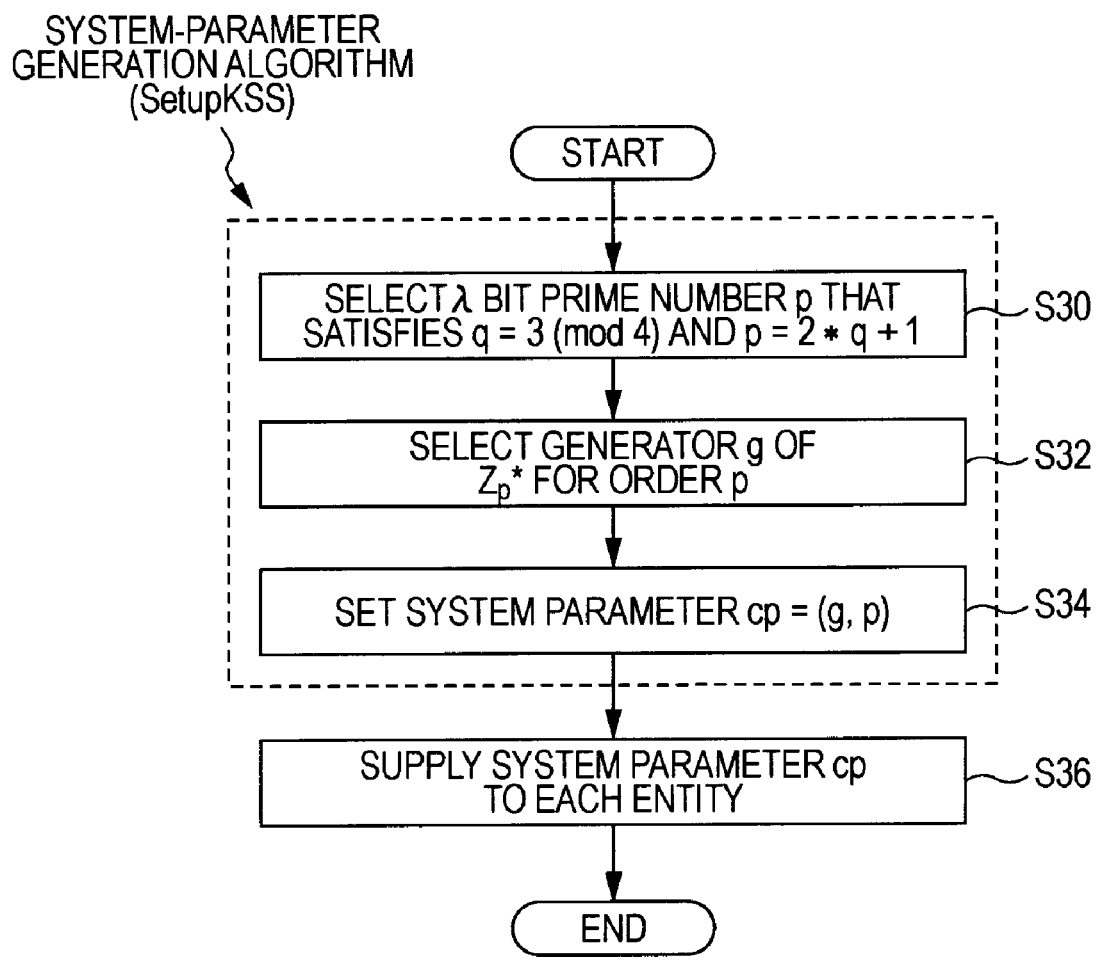
FIG. 6 is a flow diagram illustrating a system-parameter generation and supplying method in the SC08 scheme.

The system-parameter generation algorithm (SetupKSS) expressed by equation (1) noted above will first be described with reference to FIG. 6. FIG. 6 is a flow diagram illustrating one example of specific computations in the system-parameter generation algorithm. The system administrator executes the system-parameter generation algorithm.

In the system-parameter generation algorithm, first, in step S30, for a prime number q=3 (mod 4), a λ bit prime number p is selected so as to satisfy:

$$p=2q+1 \quad (6)$$

Next, in step S32, a generator g of $Z_p^*$ for order p is selected. In this case, $Z_p$ denotes an integer finite field modulo a prime number p and $Z_p^*$ denotes a multiplicative group thereof. In step S34, a system parameter cp containing the prime number p and the generator g is set such that cp=(g, p). The description thus far relates to the system-parameter generation algorithm. When the system parameter cp is generated as described above, the system administrator supplies the system parameter cp to each entity in step S36. In the description below, it is assumed that the system parameter cp has been supplied to each entity.

(Key Generation Algorithm and Signature Generation Algorithm)

Figure 7:
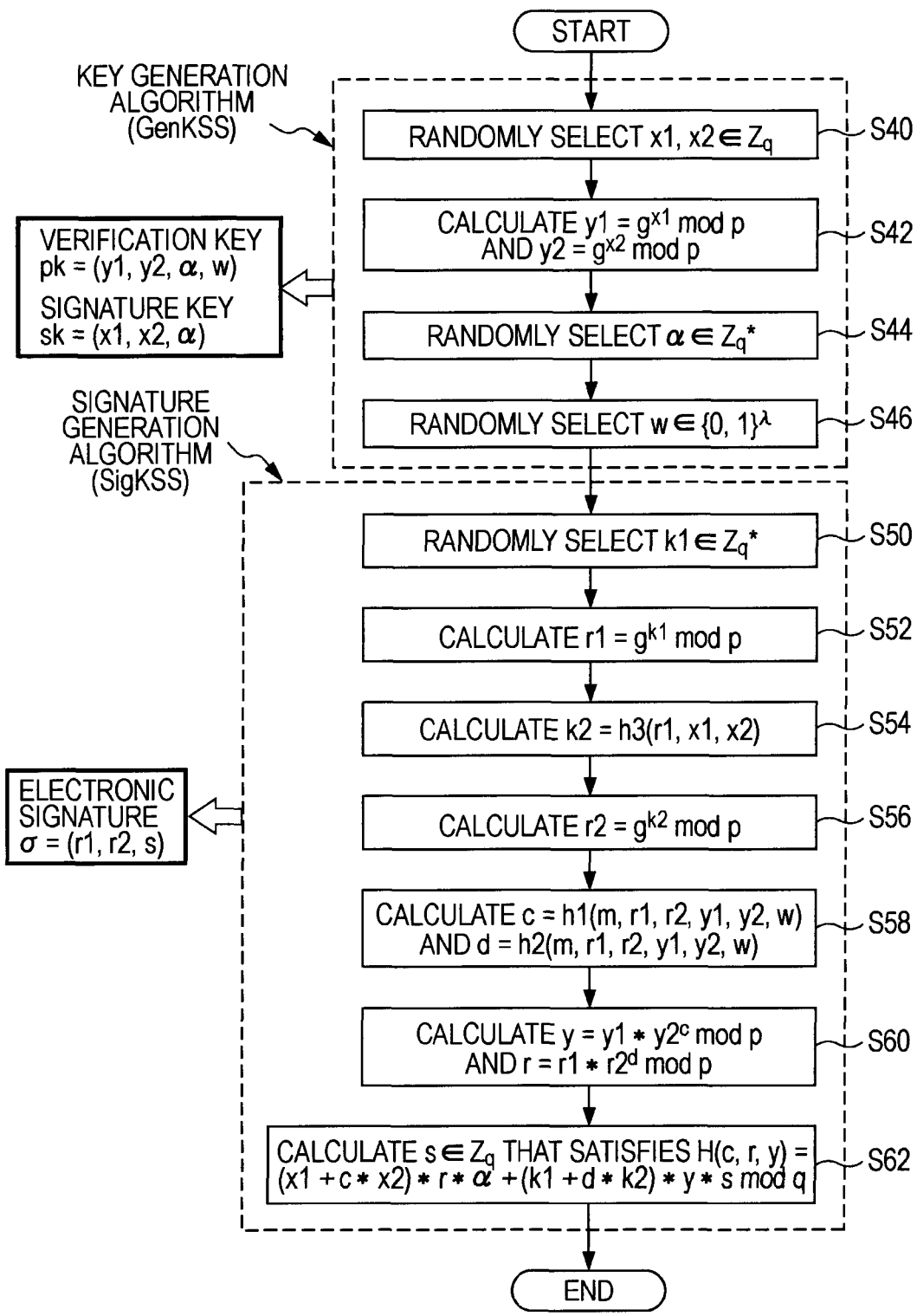
FIG. 7 is a flow diagram illustrating the electronic-signature generation method in the SC08 scheme.

Next, the key generation algorithm (GenKSS) expressed by equation (2) noted above and the signature generation algorithm expressed by equation (3) noted above will be described with reference to FIG. 7. FIG. 7 is a flow diagram illustrating one example of specific computations in the key generation algorithm and the signature generation algorithm (SigKSS). The signer executes the key generation algorithm and the signature generation algorithm.

The key generation algorithm will be described first. In the key generation algorithm, first, in step S40, generators x1 and x2 of $Z_q$ are selected randomly. Next, in step S42, the selected generators x1 and x2 are used to determine y1 and y2, as expressed by:

$$y1=g^{x1} \bmod p \quad (7)$$

$$y2=g^{x2} \bmod p \quad (8)$$

Next, in step S44, a generator α of $Z_q^*$ is selected randomly. In step S46, a generator w of $\{0,1\}^\lambda$ is selected randomly. The processing procedures in steps S44 and S46 can be modified as appropriate. The description thus far relates to the key generation algorithm. As a result of the above-described computations, a verification key pk and a signature key sk are generated respectively as expressed by:

$$pk=(y1,y2,\alpha,w) \quad (9)$$

$$sk=(x1,x2,\alpha) \quad (10)$$

The signature generation algorithm will be described next. As expressed by equation (3) noted above, the signature key sk generated by the key generation algorithm and the electronic document m are input to the signature generation algorithm. However, since the verification key pk is also already determined, the verification key pk may also be added to the input values. With the input values being changed as such, for example, when the same arithmetic equation as for y1 or y2 expressed by equation (7) or (8) is included in the signature generation algorithm, the computation processing does not have to be performed. In the following description, portions containing the same arithmetic equations as equations (7) and (8) noted above are denoted by y1 and y2, respectively.

In the signature generation algorithm, first, in step S50, a generator k1 of $Z_q^*$ is selected randomly. Next, in step S52, the selected generator k1 is used to determine r1 expressed as:

$$r1 = g^{k1} \bmod p \tag{11}$$

Next, in step S54, r1, x1, and x2 are used to determine k2 expressed as:

$$k2 = h3(r1, x1, x2) \tag{12}$$

where h3( ) is a hash function. The hash function is a function for generating a numeric value in a certain range from a bit sequence $a \in \{0, 1\}^*$. A value obtained by applying a bit sequence to the hash function is referred to as a "hash value". In equation (12), r1, x1, and x2 given as parameters are, for example, coupled in their bit sequences and are input to the hash function h3. It is to be noted that processing performed for inputting of the parameters is not limited to the coupling.

In step S56, the determined k2 is used to determine r2 expressed as:

$$r2 = g^{k2} \bmod p \tag{13}$$

Next, in step S58, the electronic document m to which the electronic signature σ is attached, the parameters r1 and r2 determined in the above-described computations, and y1 and y2 (which can also be generated from x1 and x2) contained in the verification key pk are used to determine parameters c and d expressed as:

$$c = h1(m, r1, r2, y1, y2, w) \tag{14}$$

$$d = h2(m, r1, r2, y1, y2, w) \tag{15}$$

where h1( ) and h2( ) are hash functions. The parameters m, r1, r2, y1, y2, and w are input to each hash function, for example, after coupling. It is to be noted that processing performed for inputting of the parameters is not limited to the coupling.

In step S60, the determined parameters c and d are used to determine y and r expressed as:

$$y = y1 \cdot y2^c \bmod p \tag{16}$$

$$r = r1 \cdot r2^d \bmod p \tag{17}$$

Next, in step S62, the parameters obtained in steps S50 to S60 are used to determine a generator s of $Z_q$ so as to satisfy:

$$H(c, r, y) = (x1 + c \cdot x2) r \cdot \alpha + (k1 + d \cdot k2) y \cdot s \bmod q \tag{18}$$

where H( ) is a hash function. The parameters c, r, and y are input to the hash function, for example, after coupling. It is to be noted that processing performed for inputting of the parameters is not limited to the coupling. The above-described computations yield an electronic signature σ expressed by:

$$\sigma = (r1, r2, s) \tag{19}$$

(Signature Verification Algorithm)

Figure 8:
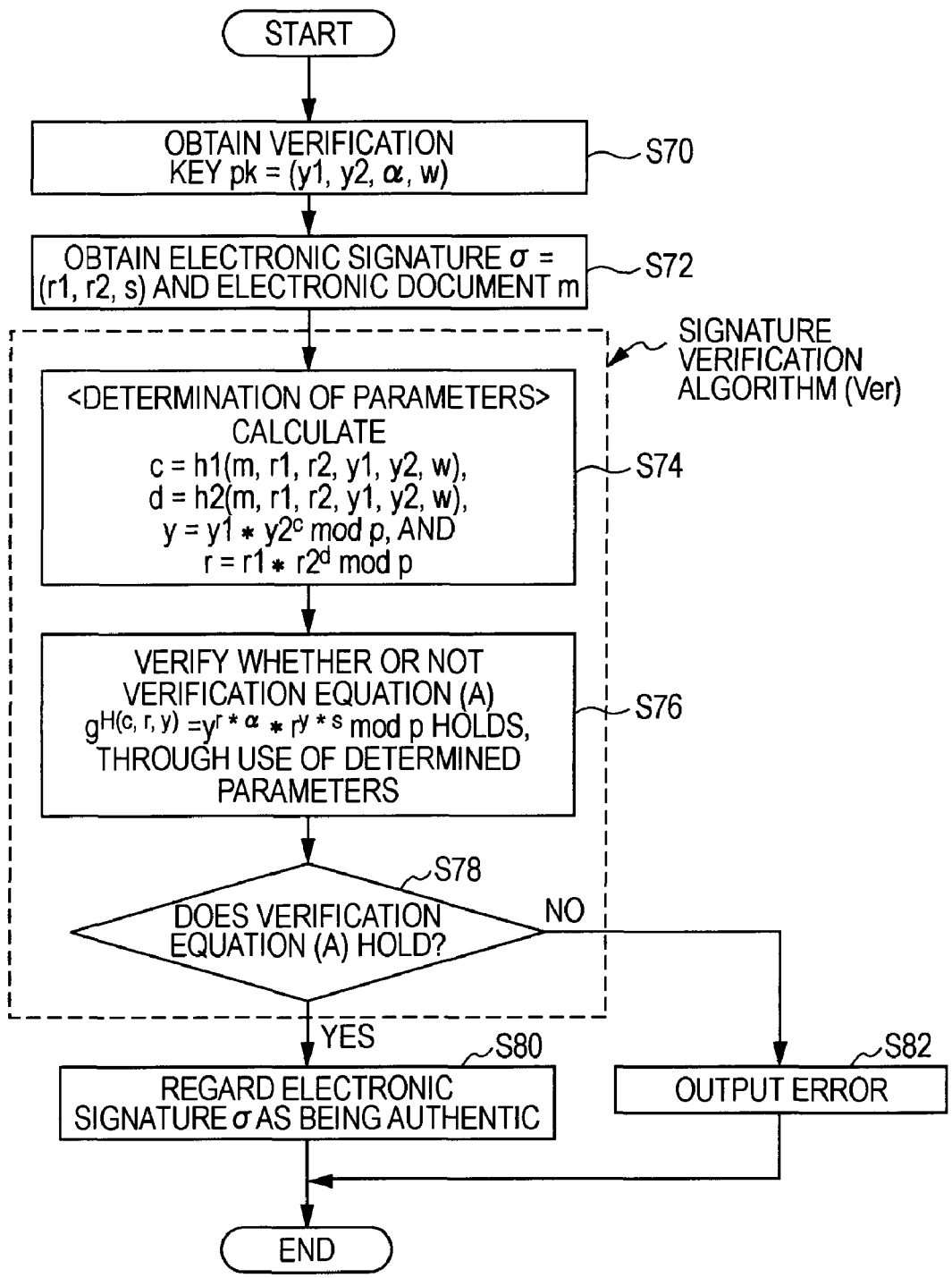
FIG. 8 is a flow diagram illustrating the electronic-signature verification method in the SC08 scheme.

The signature verification algorithm expressed by equation (5) noted above will be described next with reference to FIG. 8. FIG. 8 is a flow diagram illustrating one example of specific computations in the signature verification algorithm in the SC08 scheme. The verifier executes the signature verification algorithm.

First, in step S70, the verifier obtains the publicly available verification key pk (see equation (9)). In step S72, the verifier obtains the electronic signature σ (see equation (19)) and the electronic document m from the signer. The verifier inputs the obtained information to the signature verification algorithm to verify the electronic signature σ. It is assumed that the verifier has also pre-obtained the system parameter.

In step S74, in the signature verification algorithm in the SC08 scheme, parameters c, d, y, and r are determined from equations (14), (15), (16), and (17) noted above. The determined parameters are then substituted into a verification equation (A) expressed as $$g^{H(c, r, y)} = y^{r \cdot \alpha} \cdot r^{y \cdot s} \bmod p \tag{20}$$

and whether or not the verification equation (A) holds is verified in step S76. When the verification equation (A) holds in step S78, the electronic signature σ is regarded as being authentic and an output value $v_{out}=1$ indicating "accept" is output in step S80, thereby ending the series of processing. On the other hand, when the verification equation (A) does not hold in step S78, an output value $v_{out}=0$ indicating an error is output in step S82, thereby ending the series of processing. As a result of the above-described computations, the validity of the electronic signature σ for the electronic document m is verified.

(Idea of SC08 Scheme)

It is not too much to say that the electronic signature scheme is governed by the form of its verification equation. The above-noted verification equation (A) is unique to the SC08 scheme. The verification equation (A) is developed by modifying an ElGamal-signature-scheme verification equation expressed by:

Electronic Signature: $\sigma = (r, s), r = g^k \bmod p$,

Signature Key: $sk = x \in Z_p^*$,

Verification Key: $pk = y = g^x \bmod p$,

Verification Equation: $g^{H(m, r)} = y^r \cdot r^s \bmod p$ (21)

For the ElGamal signature system, when the generator g of $Z_p^*$ for order q is used as a system parameter with respect to prime numbers q and p where $p = 2 \cdot q + 1$ and $q \equiv 3 \pmod 4$, only one verification key pk that accepts the pair of the electronic document m and the electronic signature σ exists. Thus, when an attempt is made to configure a signature generation system on the basis of the verification equation of the ElGamal signature scheme, a substitute key is not generated in general. Therefore, what was conceived was the SC08 scheme verification equation (A) expressed as equation (20) noted above. The idea of the SC08 scheme will be described in a little more detail.

First, in the SC08 scheme, the element of the verification key pk is added and the verification equation is modified. In this case, consideration is also given to (1) a substitute key can be generated through interaction with an authentic signer and (2) a substitute verification key is not generated without permission unless interaction with an authentic signer is performed. Sakumoto et al. first paid attention to the fact the ElGamal signature scheme has a property of being unable to calculate an electronic signature that satisfies the verification equation even when the verification key is given. By paying attention to the property of the ElGamal signature scheme and referring to the verification equation expressed by equation (21), Sakumoto et al. also noticed that a verification key that satisfies the verification equation is not calculated even when an electronic signature is given, when the element r of the electronic signature and the element y of the verification key, the elements appearing in the verification equation, are symmetrical. The term "symmetry" used in this case refers to a form $(a^b \cdot b^a)$ in which b is shown at the shoulder portion (the exponent) of a and a is shown at the shoulder portion (the exponent) of b.

Based on the idea, Sakumoto et al. added a parameter α to the verification key pk, as expressed by:

$$pk=(y,a) \quad (22)$$

and converted the verification equation into a verification equation expressed as:

$$g^{H(m,r,y)}=y^{r\cdot\alpha}\cdot r^{y\cdot s} \bmod p \quad (23)$$

Addition of the parameter α to the verification key pk has made it possible to generate a substitute key. However, the use of verification equation (23) that holds based on the verification key pk expressed by equation (22) allows the substitute-key generator to calculate the original signature key sk. For example, for the substitute signature key sk'=x' and the substitute verification key pk'=(y', α'), the substitute-key generator can determine a parameter k that should be secretly held by the signer, on the basis of:

$$H(m,r,y')=x'\cdot r\cdot\alpha+k\cdot y'\cdot s \bmod q \quad (24)$$

In addition, it is known that the use of the original signature sk=x satisfies:

$$H(m,r,y)=x\cdot r\cdot\alpha+k\cdot y\cdot s \bmod q \quad (25)$$

Thus, the use of the parameter k makes it possible to determine the signature key sk from equation (25).

Accordingly, Sakumoto et al. duplicated the parameters contained in the signature key sk and the verification key pk, as expressed by equations (9) and (10), so as to prevent the substitute-key generator from generating the original signature key sk. Naturally, parameters contained the substitute signature key sk' and the substitute verification key pk' are also duplicated. In the SC08 scheme, consideration is also given so as to prevent the signer from generating the substitute signature key sk' secretly held by the substitute-key generator. The SC08 scheme is based on such an idea. A description will now be given of an SC08-scheme substitute-key generation algorithm realized based on the idea.

(Substitute-Key Generation Algorithm)

Figure 9:
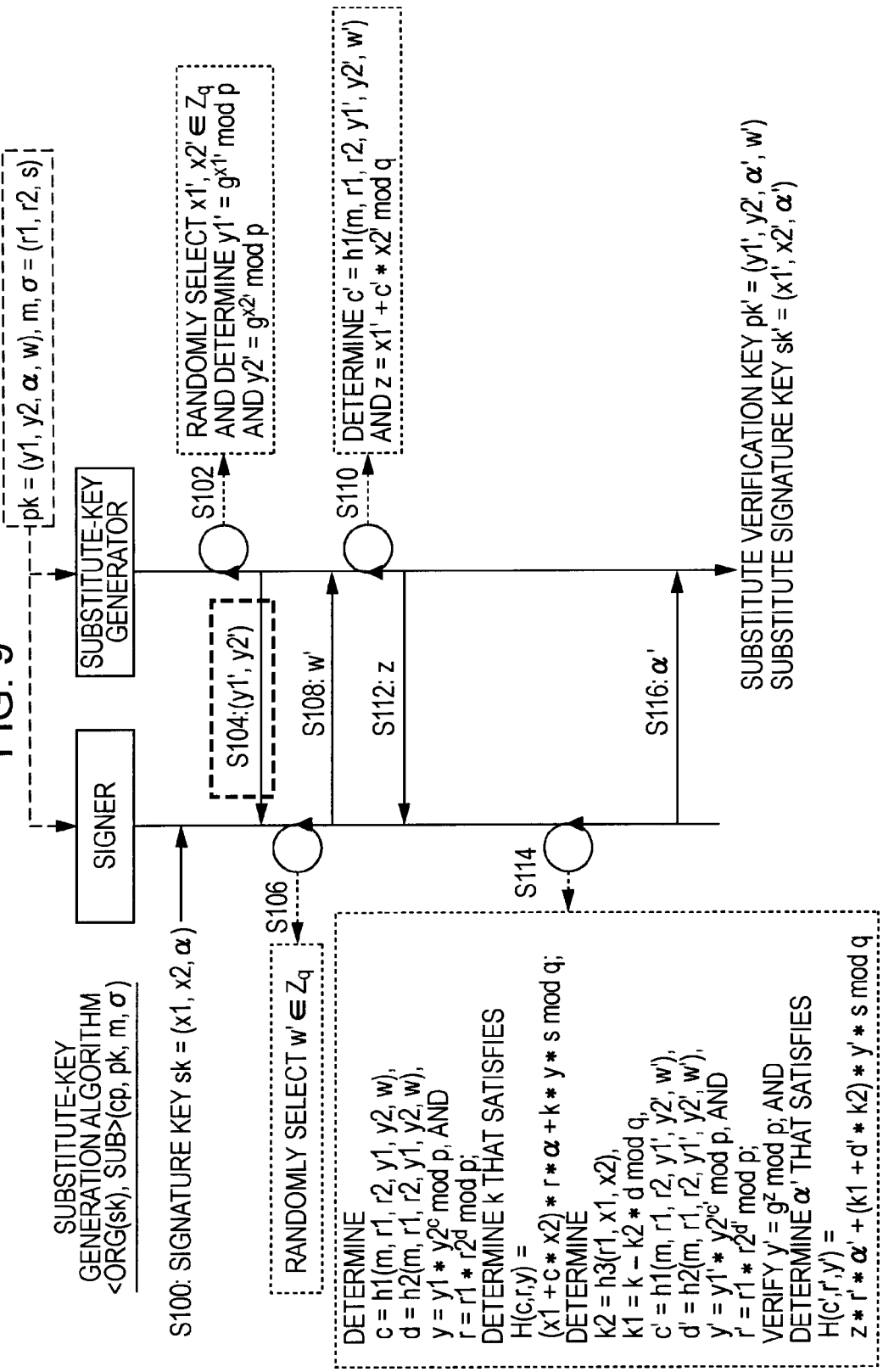
FIG. 9 is a flow diagram illustrating details of the substitute-key generation method in the SC08 scheme.

The substitute-key generation algorithm expressed by equation (4) noted above will be described next with reference to FIG. 9. FIG. 9 is a flow diagram illustrating one example of specific computations in the substitute-key generation algorithm in the SC08 scheme. The substitute-key generation algorithm is based on an interaction protocol and is realized through interaction between the signer and the substitute-key generator.

In the substitute-key generation algorithm, first, in step S100, the signer inputs a signature key sk. However, the signature key sk is not supplied to the substitute-key generator. In step S102, the substitute-key generator randomly selects generators x1' and x2' of $Z_q$ to determine y1' and y2' expressed as:

$$y1'=g^{x1'} \bmod p \quad (26)$$

$$y2'=g^{x2'} \bmod p \quad (27)$$

where x1' and x2' are parameters to be contained in the substitute signature key sk' and y1' and y2' are parameters to be contained in the substitute verification key pk'. In step S104, the substitute-key generator supplies y1' and y2' to the signer. Next, in step S106, the signer randomly selects a generator w' of $Z_q$. In step S108, the signer supplies w' to the substitute-key generator.

Upon receiving w', in step S110, the substitute-key generator uses w' to determine c' and z expressed respectively as:

$$c'=h1(m,r1,r2,y1',y2',w') \quad (28)$$

$$z=x1'=c'\cdot x2' \bmod q \quad (29)$$

Next, in step S112, the substitute-key generator supplies z to the signer. It is to be noted that z contains parameters x1' and x2' that constitute parts of the substitute signature key sk' and is supplied to the signer in such a form that x1' and x2' are not individually identifiable. Next, upon receiving z, the signer determines c, d, y, and r by using equations (14), (15), (16), and (17) noted above and determines k that satisfies equation (18). In many cases, the signer does not have the parameters k1 and k2. Thus, in this case, the parameters k1 and k2 are to be recalculated.

Needless to say, the these computations can be omitted when the signer has the parameters k1 and k2. The signer determines k2 by using equation (12) noted above and then determines k1 by substituting the determined k and k2 into:

$$k1=k-d\cdot k2 \bmod q \quad (30)$$

At this stage, the parameters k1 and k2 have been obtained. Next, the signer determines c' on the basis of equation (28) noted above. The signer further determines d' on the basis of:

$$d'=h2(m,r1,r2,y1',y2',w') \quad (31)$$

Next, the signer determines y' and r' on the basis of:

$$y'=y1'\cdot y2'^{c'} \bmod p \quad (32)$$

$$r'=r1\cdot r2^{d'} \bmod p \quad (33)$$

In addition, by using the determined y', the signer verifies whether or not equation (34) below holds.

$$y'=g^z \bmod p \quad (34)$$

In this case, when equation (34) does not hold, the signer outputs an error, thereby ending the series of processing.

Next, in step S114, the signer determines α' that satisfies:

$$H(c',r',y')=z\cdot r'\cdot\alpha'+(k1+d'\cdot k2)y'\cdot s \bmod q \quad (35)$$

Thereafter, the signer supplies the parameter α' to the substitute-key generator. The parameter α' is combined with the parameters y1', y2', and w' to generate a substitute verification key pk'. When a' is contained in the substitute signature key sk', this means that the substitute signature key sk' is also generated at this point. The arrangement may be such that the substitute verification key pk' is generated by the signer and is supplied to the substitute signer. In the SC08 scheme, the above-described method is carried out to generate the substitute verification key pk' and the substitute signature key sk'.

The SC08 scheme has been described above in detail. A key update method according to the present scheme will be described below. The substitute-key generation method according to the present scheme is a method that employs a scheme in order for application to the key update scheme while following the basic idea of the substitute-key generation method according to the SC08 scheme. Thus, the substitute-key generation method using the key update method according to the present scheme will be described in detail with consideration being given to the above-described SC08-scheme substitute-key generation method.

[1-4: Present Scheme]

The present scheme is directed to a method for updating, even when a signature key used for an electronic signature is exposed, the signature key to a substitute signature key without invalidating an electronic signature previously generated with the signature key. Although the present scheme is similar to the SC08 scheme in that substitute keys are used, it is to be noted that the present scheme relates to a key update method, unlike the above-described SC08 scheme.

(1-4-1: System Configuration)

Figure 10:
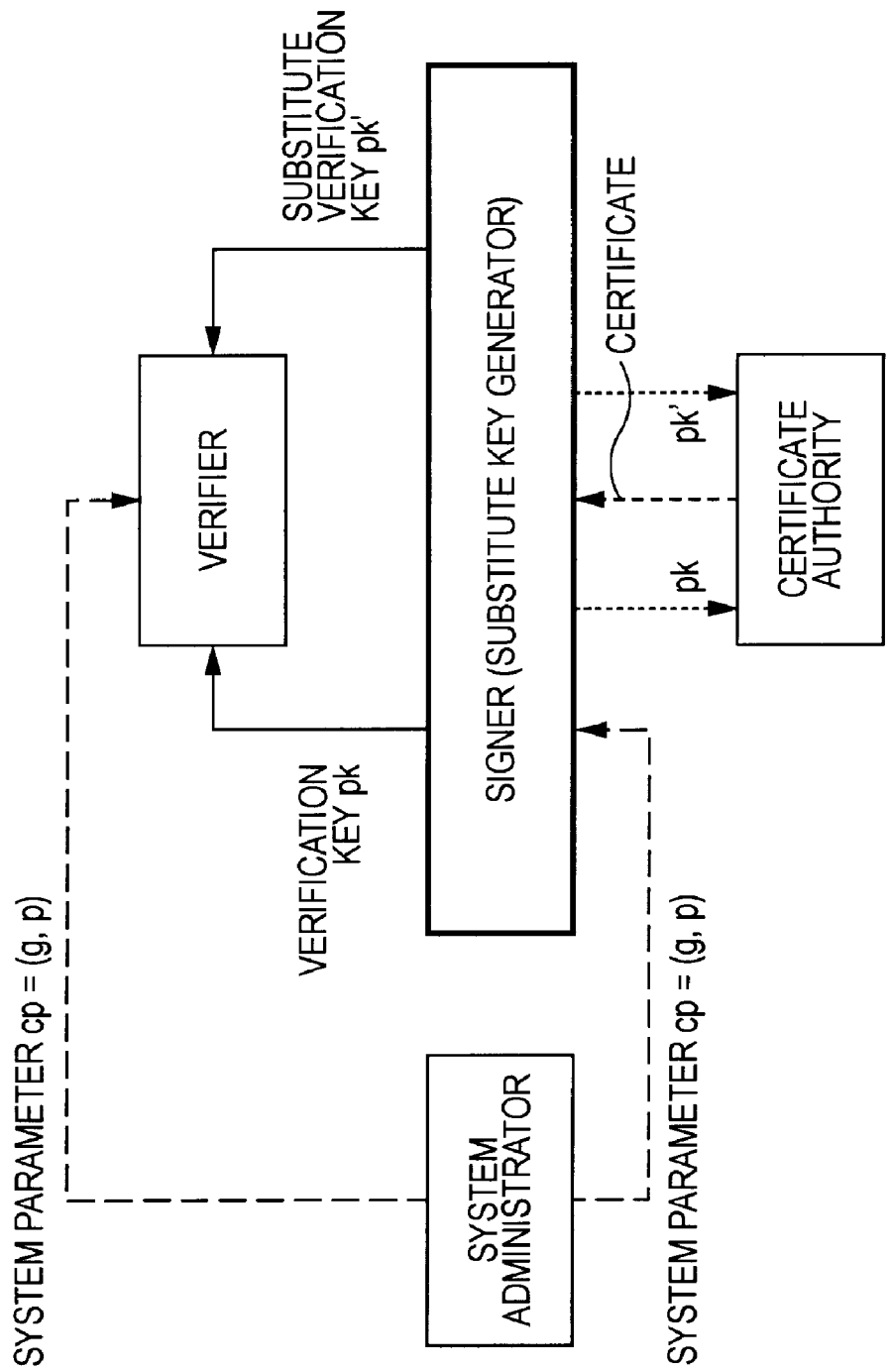
FIG. 10 is a diagram illustrating one example of the configuration of entities in a key-substitutable electronic signature scheme according to one embodiment of the present invention.

A system configuration according to the present scheme will be described first. In the present scheme, four entities are envisioned as models in the electronic signature system. As illustrated in FIG. 10, the four entities envisioned in the present scheme are a system administrator, a signer (a substitute-key generator), a verifier, and a certificate authority. Although the substitute signer is envisioned as the substitute-key generator in the SC08 scheme, the signer acts as an entity of the substitute-key generator in the present scheme. The system administrator is an entity for generating a system parameter cp by using a system-parameter generation algorithm (Setup).

The signer is an entity for generating a signature key sk unique to the signer and a verification key pk paired with the signature key sk by using a key generation algorithm (Gen). The signer also generates an electronic signature σ for an electronic document m by using a signature generation algorithm (Sig). The signer further generates a substitute signature key sk' and a substitute verification key pk' paired with the substitute signature key sk', by using a substitute-key generation algorithm. The verifier is an entity for verifying the validity of the electronic signature σ attached to the electronic document m by using a signature verification algorithm (Ver). The certificate authority is the entity for issuing a certificate for guaranteeing the validity of the verification key or the substitute verification key generated by the signer.

Figure 11:
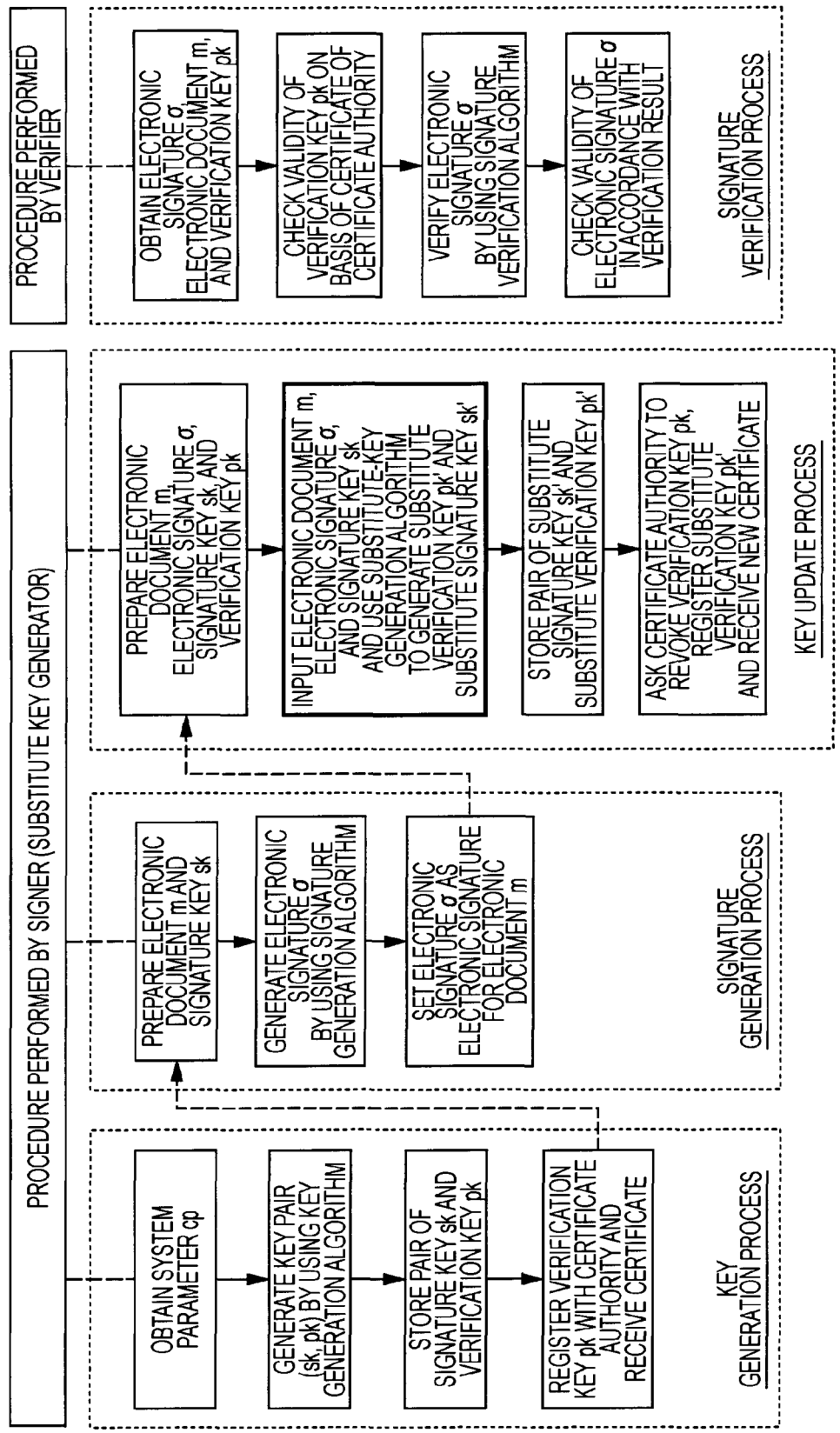
FIG. 11 is a flow diagram illustrating a substitute-key generation method, a key update method, an electronic-signature generation method, and an electronic-signature verification method in the key-substitutable electronic signature scheme according to the embodiment.

By executing a procedure according to the present scheme, as illustrated in FIG. 11, those entities generate the signature key sk, the verification key pk, the electronic signature σ, the substitute signature key sk', and the substitute verification key pk' and verify the electronic signature σ. It is assumed that the system parameter cp is already generated by the system administrator using the system-parameter generation algorithm (Setup). Generation of the system parameter cp by using the system-parameter generation algorithm (Setup) is expressed by:

$$cp = \text{Setup}(1^\lambda) \quad (36)$$

where $1^\lambda$ denotes a security parameter.
(Key Generation Process by Signer)

A key generation procedure performed by the signer will be described first. As illustrated in FIG. 11, in a key generation process, the signer obtains the system parameter cp from the system administrator. Subsequently, the signer inputs the system parameter cp to the key generation algorithm (Gen) to generate a pair of a signature key sk and a verification key pk. Generation of (sk, pk) by using Gen is expressed by:

$$(sk, pk) = \text{Gen}(cp) \quad (37)$$

When the signature key sk and the verification key pk are generated using the key generation algorithm (Gen), the signer stores the pair of the generated signature key sk and verification key pk. The signer registers, as his/her verification key, the verification key pk with the certificate authority and receives a certificate thereof, as appropriate.
(Signature Generation Process by Signer)

A signature generation procedure performed by the signer will be described next. As illustrated in FIG. 11, the signer prepares an electronic document m to be signed and the stored signature key sk. The signer then inputs the signature key sk and the electronic document m to the signature generation algorithm (Sig) to generate an electronic signature σ. Generation of the electronic signature σ by using Sig is expressed as:

$$\sigma = \text{Sig}(sk, m) \quad (38)$$

The signer then sets the electronic signature σ (the algorithm output value), generated by equation (38), as the electronic signature σ for the electronic document m.

(Substitute Key Generation Process by Signer)

An overview of a substitute-key generation procedure performed by the signer will be described next. This procedure may be performed when the signature key sk is exposed or may be performed in advance. First, the signer prepares the electronic document m, the electronic signature σ, the signature key sk used for generating the electronic signature σ, and the verification key pk paired with the signature key sk. The signer then inputs the prepared electronic document m, the electronic signature σ, and the signature key sk to the substitute-key generation algorithm to generate a pair of a substitute verification key pk' and a substitute signature key sk'. Thereafter, the signer stores the pair of the substitute signature key sk' and the substitute verification key pk'. The signature then asks the certificate authority so as to revoke the verification key pk, newly registers the substitute verification key pk' with the certificate authority, and receives a certificate, as appropriate.
(Signature Verification Process by Verifier)

A procedure performed by the verifier will be described next. First, the verifier obtains the electronic signature σ, the electronic document m, and the verification key pk from the signer. Next, on the basis of the certificate of the certificate authority, the verifier checks whether or not the verification key pk is truly the verification key of the signer, as appropriate. The verifier then inputs the verification key pk, the electronic document m, and the electronic signature σ to the signature verification algorithm (Ver) to determine whether a verification result $V_{out}$ is 0 (error) or 1 (accept). Determination of the verification result $V_{out}$ by using Ver is expressed as:

$$v_{out} = \text{Ver}(pk, m, \sigma) \quad (39)$$

In accordance with the verification result $v_{out}$ determined based on equation (39), the verifier accepts (σ, m) for $v_{out}=1$ and rejects (σ, m) for $v_{out}=0$. The same applies to a case in which a verification procedure is performed using the substitute verification key pk'.

As described above, in the present scheme, the substitute signature key sk' and the substitute verification key pk' are used to update the original signature key sk and the verification key pk. Thus, even when the signature key sk and the verification key pk are revoked, the electronic signature σ previously generated by the signer by using the signature key sk can be kept valid. Now, the validity of the present scheme will be described while comparing the present scheme with key update methods in typical electronic signature schemes.
(1-4-2: Key Update Method Comparison)

Figure 12:
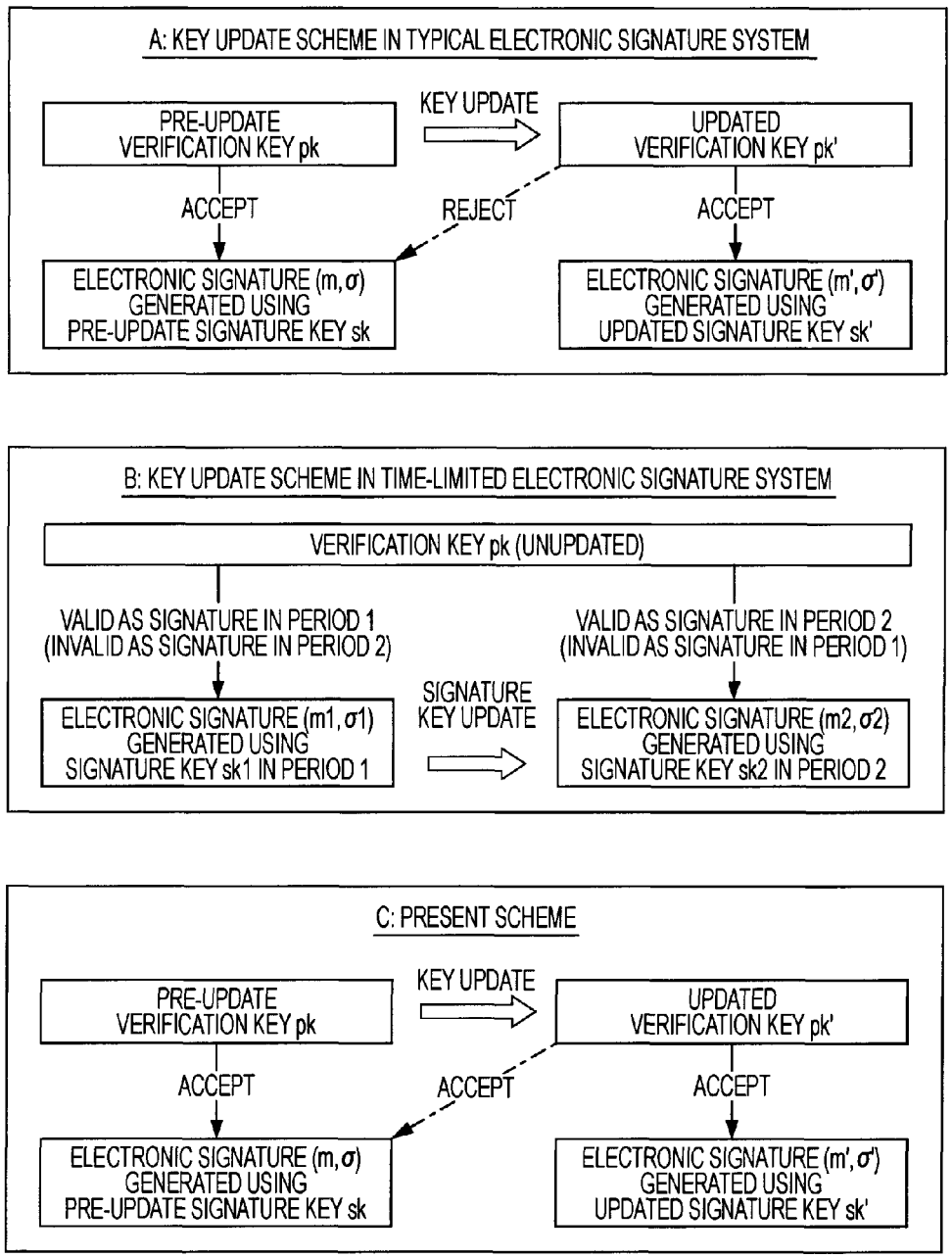
FIG. 12 is a diagram illustrating comparisons between the key update method according to the embodiment and other key update methods.

Reference is made to FIG. 12. Scheme A represents a key update scheme in a typical electronic signature system. In scheme A, an electronic signature σ generated for an electronic document m by using a pre-update signature key sk is accepted by a pre-update verification key pk, but is not accepted by an updated verification key pk'. Thus, after the key update, an electronic signature σ' generated for an electronic document m' by using an updated signature key sk' is valid, but the pre-update electronic signature σ becomes invalid. Needless to say, the electronic signature σ' after the key update is accepted by the updated verification key pk'.

Next, reference is made to scheme B in FIG. 12. Scheme B represents a key update scheme in a time-limited electronic signature system. In scheme B, a signature key is updated in each period. A verification key pk, on the other hand, is left unupdated in all periods. An electronic signature σ1 generated with a signature key sk1 in period 1 is accepted as a signature in period 1. Similarly, an electronic signature σ2 generated with a signature key sk2 in period 2 is accepted as a signature in period 2. Thus, even when the signature key sk1 in period 1 is revoked, the electronic signature σ2 generated with the signature key sk2 in period 2 is kept valid. However, the electronic signature σ1 in period 1 becomes invalid. The problem of this scheme has already been described above with reference to FIG. 21.

Next, reference is made to scheme C in FIG. 12. Scheme C represents a key update scheme according to the present scheme. As in scheme C, when the present scheme is used, an electronic signature σ generated for an electronic document m by using a pre-update signature key sk is accepted by an updated verification key pk' (a substitute verification key pk'). Thus, even when the pre-update signature key sk and verification key pk are revoked, the validity of the electronic signature σ before the key update is not lost. Such an effect is not offered by any use of key update schemes as schemes A and B described above. Specific algorithms of the present scheme will now be described based on the above-described technical features of the present scheme.

(1-4-3: Algorithms)

Now, a description will be given of a key generation algorithm, a signature generation algorithm, a signature verification algorithm, and a substitute-key generation algorithm according to the present scheme. Since a system-parameter generation algorithm according to the present scheme is substantially the same as that in the SC08 scheme, a description thereof is not given below. Those algorithms are correlated with each other, each of which has a characteristic element for realizing the substitute-key generation algorithm according to the present scheme.

(Key Generation Algorithm and Signature Generation Algorithm)

First, the key generation algorithm (Gen) expressed by equation (37) noted above and the signature generation algorithm (Sig) expressed by equation (38) noted above will be described with reference to FIG. 13. The signer executes the key generation algorithm and the signature generation algorithm. FIG. 13 is a flow diagram illustrating one example of specific computations in the key generation algorithm and the signature generation algorithm. Changes can be made as appropriate, within the scope of the idea of the present scheme. It is to be noted that any configuration to which such changes are made is also encompassed by the technical scope of the present scheme.

The key generation algorithm will be described first. In the key generation algorithm, first, in step S130, generators x1 and x2 of $Z_q$ are selected randomly. Next, in step S132, the selected generators x1 and x2 are used to determine y1 and y2, as expressed by:

$$y1 = g^{x1} \bmod p \qquad (40)$$

$$y2 = g^{x2} \bmod p \qquad (41)$$

Next, in step S134, a generator α of $Z_q^*$ is selected randomly. The processing procedure in step S134 can be modified as appropriate. The description thus far relates to the key generation algorithm. As a result of the above-described computations, a verification key pk and a signature key sk are generated respectively as expressed by:

$$pk = (y1, y2, \alpha) \qquad (42)$$

$$sk = (x1, x2, \alpha) \qquad (43)$$

It is to be noted that the configuration of the verification key pk expressed by equation (42) is different from the configuration in the SC08 scheme.

The signature generation algorithm will be described next. As expressed by equation (38) noted above, the signature key sk generated by the key generation algorithm and the electronic document m are input to the signature generation algorithm. However, since the verification key pk is also already determined, the verification key pk may also be added to the input values. With the input values being changed as such, for example, when the same arithmetic equation as for y1 or y2 expressed by equation (40) or (41) is included in the signature generation algorithm, the computation processing does not have to be performed. In the following description, portions containing the same arithmetic equations as equations (40) and (41) noted above are denoted by y1 and y2, respectively.

In the signature generation algorithm, first, in step S136, a generator k of $Z_q^*$ is selected randomly. Next, in step S138, the selected generator k is used to determine r expressed as:

$$r = g^k \bmod p \qquad (44)$$

Next, in step S140, the electronic document m to which the electronic signature σ is attached, the parameter r determined in the above-described computation, and y1 and y2 (which can also be generated from x1 and x2) contained in the verification key pk are used to determine a parameter c expressed as:

$$c = h1(m, r, y1, y2) \qquad (45)$$

where h1( ) is a hash function. The parameters m, r, y1, and y2 are input to the hash function, for example, after coupling. It is to be noted that processing performed for inputting of the parameters is not limited to the coupling. It is also to be noted that the configuration of the parameters input to the hash function h1 is different from the configuration in the SC08 scheme.

In step S142, the determined parameter c is used to determine y expressed by:

$$y = y1 \cdot y2^c \bmod p \qquad (46)$$

Next, in step S144, the parameters obtained in steps S130 to S142 are used to determine a generator s of $Z_q$ so as to satisfy:

$$H(c, r, y) = (x1 + c \cdot x2) r \cdot \alpha + k \cdot y \cdot s \bmod q \qquad (47)$$

where H( ) is a hash function. The parameters c, r, and y are input to the hash function, for example, after coupling. It is to be noted that processing performed for inputting of the parameters is not limited to the coupling. The above-described computations yield an electronic signature σ expressed by:

$$\sigma = (r, s) \qquad (48)$$

(Signature Verification Algorithm)

The signature verification algorithm expressed by equation (39) noted above will be described next with reference to FIG. 14. FIG. 14 is a flow diagram illustrating one example of specific computations in the signature verification algorithm according to the present scheme. The verifier executes the signature verification algorithm.

In step S150, the verifier obtains the publicly available verification key pk (see equation (42)). In step S152, the verifier obtains the electronic signature σ (see equation (48)) and the electronic document m from the signer. The verifier inputs the obtained information to the signature verification algorithm to verify the electronic signature σ. It is assumed that the verifier also pre-obtains the system parameter cp.

In step S154, in the signature verification algorithm, parameters c and y are determined from equations (45) and (46) noted above. The determined parameters are then substituted into a verification equation (A) expressed as $$g^{H(c,r,y)} = y^{r \cdot \alpha} \cdot r^{y \cdot s} \bmod p \qquad (49)$$

and whether or not the verification equation (A) holds is verified in step S156. When the verification equation (A) holds in step S158, the electronic signature σ is regarded as being authentic and an output value $v_{out}=1$ indicating "accept" is output in step S160, thereby ending the series of processing. On the other hand, when the verification equation (A) does not hold in step S158, an output value $v_{out}=0$ indicating an error is output in step S162, thereby ending the series of processing. As a result of the above-described computations, the validity of the electronic signature σ for the electronic document m is verified. The verification equation (A) expressed by equation (4) has the same form as the verification equation (A) in the SC08 scheme. Thus, the security offered by the SC08 scheme, the security being dependent on the form of the verification equation (A), is also followed by the present scheme.

(Substitute-Key Generation Algorithm)

The substitute-key generation algorithm according to the present scheme will be described next with reference to FIG. 15. FIG. 15 is a flow diagram illustrating one example of specific computations in the substitute-key generation algorithm according to the present scheme. Unlike the SC08 scheme, the substitute-key generation algorithm according to the present scheme does not take an interaction-based form since the substitute signer entity is absent. Thus, in the present scheme, it is possible to eliminate the elements for concealing the information of the substitute signature key sk' from the signer (the substitute-key generator). For example, in the SC08 scheme, in order to conceal the parameter k (which should be kept secret by the signer) from the substitute-key generator, the parameter k is duplicated to k1 and k2 and the parameter d is used. In the present scheme, however, those elements can be omitted. A description will be given below in detail.

In the substitute-key generation algorithm, first, in step S170, generators x1' and x2' of $Z_q$ are selected randomly. Next, in step S172, y1' and y2' are determined as expressed by:

$$y1'=g^{x1'} \bmod p \quad (50)$$

$$y2'=g^{x2'} \bmod p \quad (51)$$

where x1' and x2' are parameters to be contained in the substitute signature key sk' and y1' and y2' are parameters to be contained in the substitute verification key pk'. Next, in step S174, c and y are determined based on equations (45) and (46) noted above. In step S176, the determined c and y are used to determine k that satisfies equation (47) noted above. In many cases, the signer does not have the parameter k. Thus, in this case, the parameter k is recalculated as described above.

Needless to say, those computations can be omitted when the signer has the parameter k. In step S178, c' and y' are determined based on:

$$c'=h1(m,r,y1,y2') \quad (52)$$

$$y'=y1'\cdot y2'^{c'} \bmod p \quad (53)$$

Next, in step S180, the determined parameters c' and y' are used to determine a' that satisfies:

$$H(c',r',y')=(x1'+c'\cdot x2')r'\cdot \alpha'+k\cdot y'\cdot s \bmod q \quad (54)$$

In step S182, the parameter α' and the parameters y1' and y2' are combined with each other to generate a substitute verification key pk'. When α' is contained in the substitute signature key sk' in step S182, this means that the substitute signature key sk' is also generated at this point.

Through the above-described method, the substitute keys are generated. The use of the substitute keys to update the keys makes it difficult for even an attacker who knows the signature key sk to know the substitute signature key sk'. That is, the forgery proof of the electronic signature σ' is ensured with respect to the updated substitute verification key pk'. This point will be further described.

Let sk be a pre-update signature key, let pk be a verification key, let sk' be an updated signature key (a substitute signature key), let pk' be a verification key (a substitute verification key), and Let σ be an electronic signature generated for an electronic document m by using the signature key sk. As described above, in the key generation algorithm and the substitute-key generation algorithm according to the present scheme, parameters x and x' contained in the signature key sk and the substitute verification key sk' are duplicated to (x1, x2) and (x1', x2'), respectively. The parameter c' included in equation (54) noted above is a parameter that is dependent on the verification key and the electronic signature. Thus, even if the attacker knows the pre-update signature key sk, he or she does not identify the two unknown variables x1' and x2' from one included in equation (54). In addition, generation of an electronic signature to be accepted by the substitute verification key pk' involves information of x1'+c'*x2', and calculation thereof uses x1' and x2'. This makes it difficult to forge an electronic signature that is to be accepted by the substitute verification key pk'. Accordingly, the use of the key update scheme according to the present scheme makes it possible to update the key in a secure manner without invalidating the electronic document to which the electronic signature associated with the exposed signature key is attached.

(1-4-4: Functional Configurations of Terminals)

Now, a system configuration according to the present scheme which is capable of executing the algorithms described above will be briefly described with reference to FIG. 16. FIG. 16 illustrates the functional configurations of a signer terminal 100 used by the signer and a verifier terminal 200 used by the verifier. The signer terminal 100 and the verifier terminal 200 are connected through a network 10. Terminals used by the system administrator and the certificate authority are not illustrated.

(Signer Terminal 100)

The functional configuration of the signer terminal 100 will be described first. As illustrated in FIG. 16, the signer terminal 100 generally has a storage section 102, a key generating section 104, a signature generating section 106, a communication section 108, a substitute-key generating section 110, and an update controller 112.

The storage section 102 serves as means for storing the system parameter cp, the electronic document m, and a program for executing the algorithms. The key generating section 104 reads the system parameter cp and a key-generation-algorithm execution program from the storage section 102 to generate a signature key sk and a verification key pk. The signature key sk and the verification key pk generated by the key generating section 104 are input to the signature generating section 106. The signature generating section 106 reads the system parameter cp and a signature-generation-algorithm execution program from the storage section 102 and uses the input signature key sk (or the verification key pk) and the electronic document m to generate an electronic signature σ to be attached to the electronic document m. The electronic signature σ generated by the signature generating section 106 and the electronic document m are supplied from the communication section 108 to the verifier terminal 200 over the network 10.

If the signature key sk is exposed, the key update is executed under the control of the update controller 112. First, the update controller 112 causes the substitute-key generating section 110 to generate a substitute signature key sk' and a substitute verification key pk' which replace the signature key sk and verification key pk generated by the signature generating section 106. In this case, the substitute-key generating section 110 reads a substitute-key-generation-algorithm execution program from the storage section 102 and uses the electronic signature σ and the electronic document m signed with the exposed signature key sk to generate the substitute signature key sk' and the substitute verification key pk'. The substitute signature key sk' generated by the substitute-key generating section 110 is input to the signature generating section 106 and is used for signature generation after key update. On the other hand, the substitute verification key pk' is made publicly available. In this manner, the signer terminal 100 has a function for executing the algorithms executed by the signer according to the present scheme. Thus, the key update method according to the present scheme is realized through the use of the signer terminal 100.

(Verifier Terminal 200)

The functional configuration of the verifier terminal 200 will be described next. As illustrated in FIG. 16, the verifier terminal 200 generally has a communication section 202, a parameter generating section 204, a storage section 206, and a verification processor 208. The storage section 206 stores a system parameter cp, an algorithm execution program to be executed by the verifier, and so on.

When the communication section 202 obtains the electronic document m and the electronic signature σ from the signer terminal 100 over the network 10, the electronic document m and the electronic signature σ are input to the parameter generating section 204. The parameter generating section 204 generates parameters used for input to the verification equation. The parameter generating section 204 generates, for example, a parameter c that is dependent on the electronic document m and the electronic signature σ and that is expressed by equation (45) and so on. The parameters determined by the parameter generating section 204 are input to the verification processor 208. The verification processor 208 inputs the verification key pk, the electronic document m, the electronic signature σ, and the parameter generated by the parameters generating section 204 to the verification equation. On the basis of whether or not the verification equation holds, the verification processor 208 determines whether the electronic signature σ is to be accepted or rejected. In this manner, the verifier terminal 200 has a function for executing the algorithms to be executed by the verifier according to the present scheme. Thus, the key update method according to the present scheme is realized through the use of the verifier terminal 200.

The key update method according to the present scheme has been described above. The use of the present scheme makes it possible to solve the problem in that when a signature key used for generating an electronic signature is exposed, the electronic signature is rendered invalid. In addition, even when a signature key used for generating an electronic signature is exposed, it is possible to update the signature key for the electronic signature and the verification key without invalidating the electronic signature.

[1-5: Extended Scheme]

The above-described technology according to the present scheme relates to a method for generating a substitute signature key and a substitute verification key with respect to one set of an electronic document and an electronic signature. The above-described technique of the present scheme is thus extended to provide a method (hereinafter referred to as an "extended scheme") for generating a substitute signature key and a substitute verification key with respect to multiple sets of electronic documents and electronic signatures. The description below will be given of a method for generating a substitute signature key sk' and a substitute verification key pk' with respect to less than N sets $(m_1, \sigma_1), \ldots, (m_n, \sigma_n)$ of electronic documents and electronic signatures, where N n 2.

(1-5-1: Algorithms)

A key generation algorithm (Gen), a signature generation algorithm (Sig), a signature verification algorithm, and a substitute-key generation algorithm according to the extended scheme will be described below in sequence. Since a system-parameter generation algorithm according to the present scheme is substantially the same as that in the SC08 scheme, a description thereof is not given below. Those algorithms are correlated with each other, each of which has a characteristic configuration for realizing the substitute-key generation algorithm according to the extended scheme.

(Key Generation Algorithm and Signature Generation Algorithm)

Figure 17:
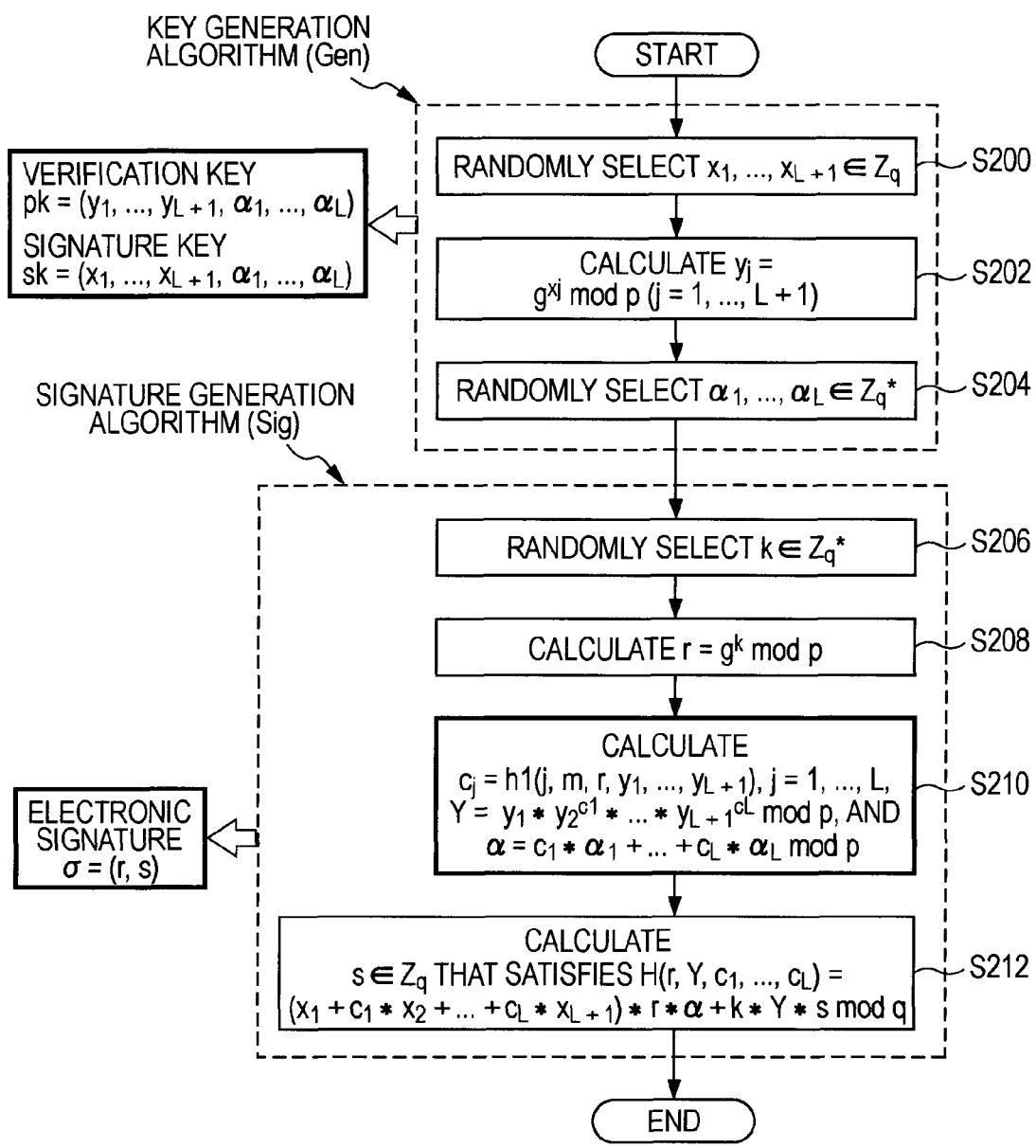
FIG. 17 is a flow diagram illustrating an electronic-signature generation method according to an extended scheme, which is an extension of the substitute-key generation method according to the embodiment.

The key generation algorithm and the signature generation algorithm according to the extended scheme will now be described with reference to FIG. 17. The signer executes the key generation algorithm and the signature generation algorithm. FIG. 17 is a flow diagram illustrating one example of specific computations in the key generation algorithm and the signature generation algorithm. Changes can be made as appropriate within the scope of the idea of the extended scheme. It is to be noted that a configuration to which such changes are made is also encompassed by the technical scope of the extended scheme.

The key generation algorithm will be described first. In the key generation algorithm, first, in step S200, generators $x_1, \ldots, x_{L+1}$ of $Z_q$ are selected randomly, where $L \geq 2$. Next, in step S202, the selected generators $x_1, \ldots, x_{L+1}$ are used to determine $y_j$ (j=1, ..., L+1), as expressed by:

$$y_j = g^{x_j} \bmod p, j=1, \ldots, L+1 \quad (55)$$

Next, in step S204, generators $\alpha_1, \ldots, \alpha_L$ of $Z_q^*$ are selected randomly. The processing procedure in steps S204 can be changed as appropriate. The description thus far relates to the key generation algorithm. As a result of the above-described computations, a verification key pk and a signature key sk are generated respectively as expressed by:

$$pk = (y1, \ldots, y_{L+1}, \alpha_1, \ldots, \alpha_L) \quad (56)$$

$$sk = (x_1, \ldots, x_{L+1}, \alpha_1, \ldots, \alpha_L) \quad (57)$$

The signature generation algorithm will be described next. The electronic document m and the signature key sk generated by the key generation algorithm are input to the signature generation algorithm. However, since the verification key pk is also already determined, the verification key pk may also be added to the input values. With the input values being changed as such, for example, when the same arithmetic equation as $y_j$ (j=1, ..., L+1) expressed by equation (55) noted above is included in the signature generation algorithm, the computation processing does not have to be performed. In the following description, a portion containing the same arithmetic equation as equation (55) is denoted by $y_j$ (j=1, ..., L+1).

In the signature generation algorithm, first, in step S206, a generator k of $Z_q^*$ is selected randomly. Next, in step S208, the selected generator k is used to determine r expressed as:

$$r = g^k \bmod p \quad (58)$$

Next, in step S210, the electronic document m to which the electronic signature σ is attached, the parameter r determined in the above-described computation, and $y_1, \ldots, y_{L+1}$ (which can also be generated from $x_1, \ldots, x_{L+1}$) contained in the verification key pk are used to determine a parameter $c_j$ (j= 1, ..., L) expressed by:

$$c_j = h1(j, m, r, y_1, \ldots, y_{L+1}), \quad (59)$$

where h1( ) is a hash function. The parameters m, r, and $y_1, \ldots, y_{L+1}$ are input to the hash function, for example, after coupling. It is to be noted that processing performed for inputting of the parameters is not limited to the coupling.

In step S210, the determined parameters $c_1, \ldots, c_L$ are used to determine Y and a expressed by:

$$Y = y_1 \cdot y_2^{c_1} \ldots y_{L+1}^{c_L} \bmod p \quad (60)$$

$$\alpha = c_1 \cdot \alpha_1 + \ldots + c_L \cdot \alpha_L \bmod p \quad (61)$$

Next, in step S212, the parameters obtained in steps S200 to S210 are used to determine a generator s of $Z_q$ so as to satisfy:

$$H(r, Y, c_1, \ldots, c_L) = (x_1 + c_1 \cdot x_2 + \ldots + c_L \cdot x_{L+1}) r \cdot \alpha + k \cdot Y \cdot s \bmod q \quad (62)$$

where H( ) is a hash function. The parameters r, Y, and $c_1, \ldots, c_L$ are input to the hash function, for example, after coupling. It is to be noted that processing performed for inputting of the parameters is not limited to the coupling. The above-described computations yield an electronic signature σ expressed by:

$$\sigma = (r, s) \quad (63)$$

(Signature Verification Algorithm)

Figure 18:
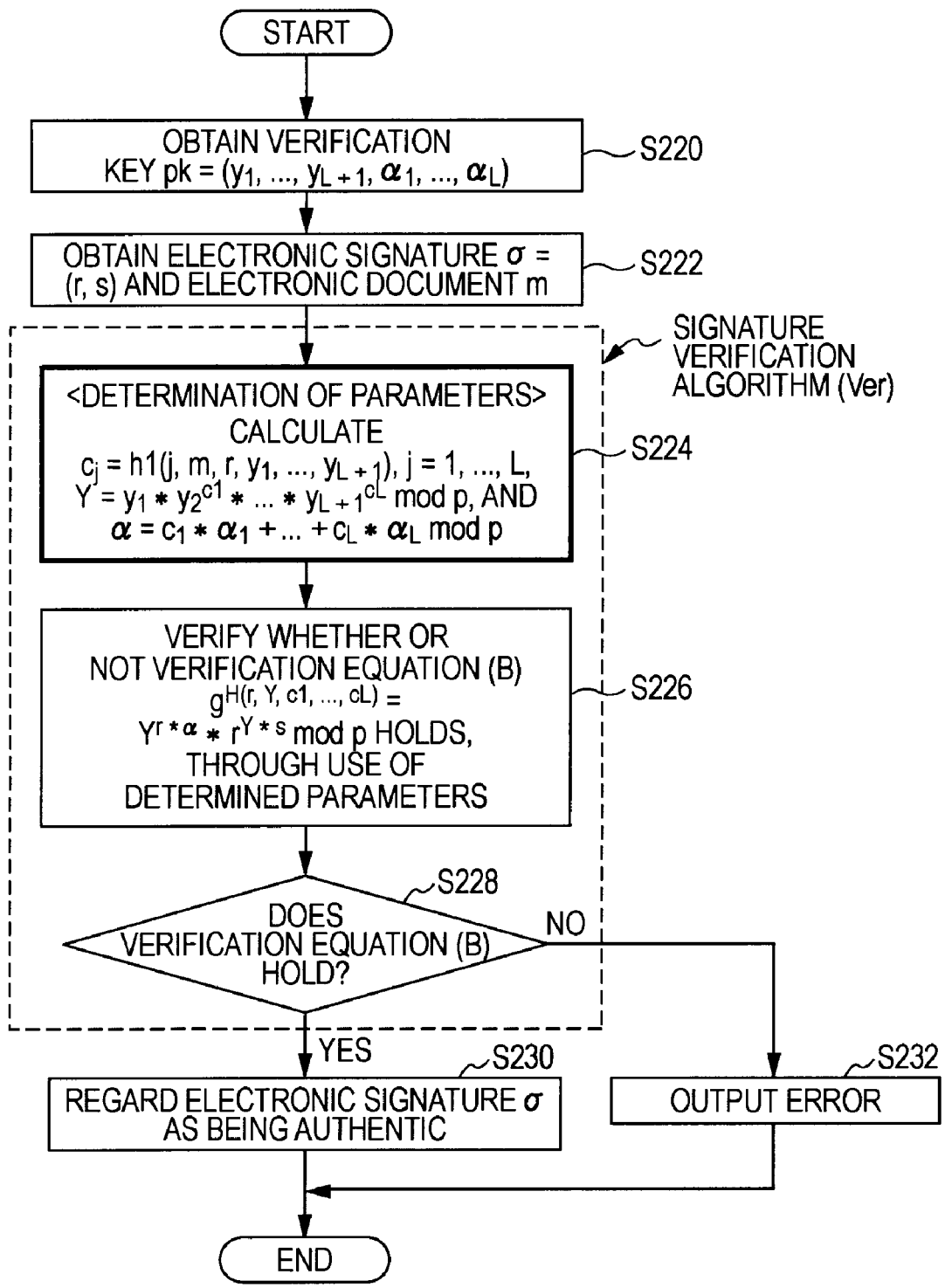
FIG. 18 is a flow diagram illustrating an electronic-signature verification method according to the extended scheme of the embodiment.

The signature verification algorithm according to the extended scheme will be described next with reference to FIG. 18. FIG. 18 is a flow diagram illustrating one example of specific computations in the signature verification algorithm. The verifier executes the signature verification algorithm.

In step S220, the verifier obtains a publicly available verification key pk (see equation (56)). In step S222, the verifier obtains an electronic signature σ (see equation (63)) and an electronic document m from the signer. The verifier inputs the obtained information to the signature verification algorithm to verify the electronic signature σ. It is assumed that the verifier has also pre-obtained the system parameter cp.

In step S224, in the signature verification algorithm, parameters $c_1, \ldots, c_L, Y$, and α are determined from equations (59), (60), and (61) noted above. The determined parameters are then substituted into a verification equation (B) expressed as $$g^{H(r, Y, c_1, \ldots, c_L)} = Y^{r \cdot \alpha} \cdot r^{Y \cdot s} \bmod p \quad (64)$$

and whether or not the verification equation (B) holds is verified in step S226. When the verification equation (B) holds in step S228, the electronic signature σ is regarded as being authentic and an output value $v_{out}=1$ indicating "accept" is output in step S230, thereby ending the series of processing. On the other hand, when the verification equation (B) does not hold in step S228, an output value $v_{out}=0$ indicating an error is output in step S232, thereby ending the series of processing. As a result of the above-described computations, the validity of the electronic signature σ for the electronic document m is verified.

(Substitute-Key Generation Algorithm)

Figure 19:
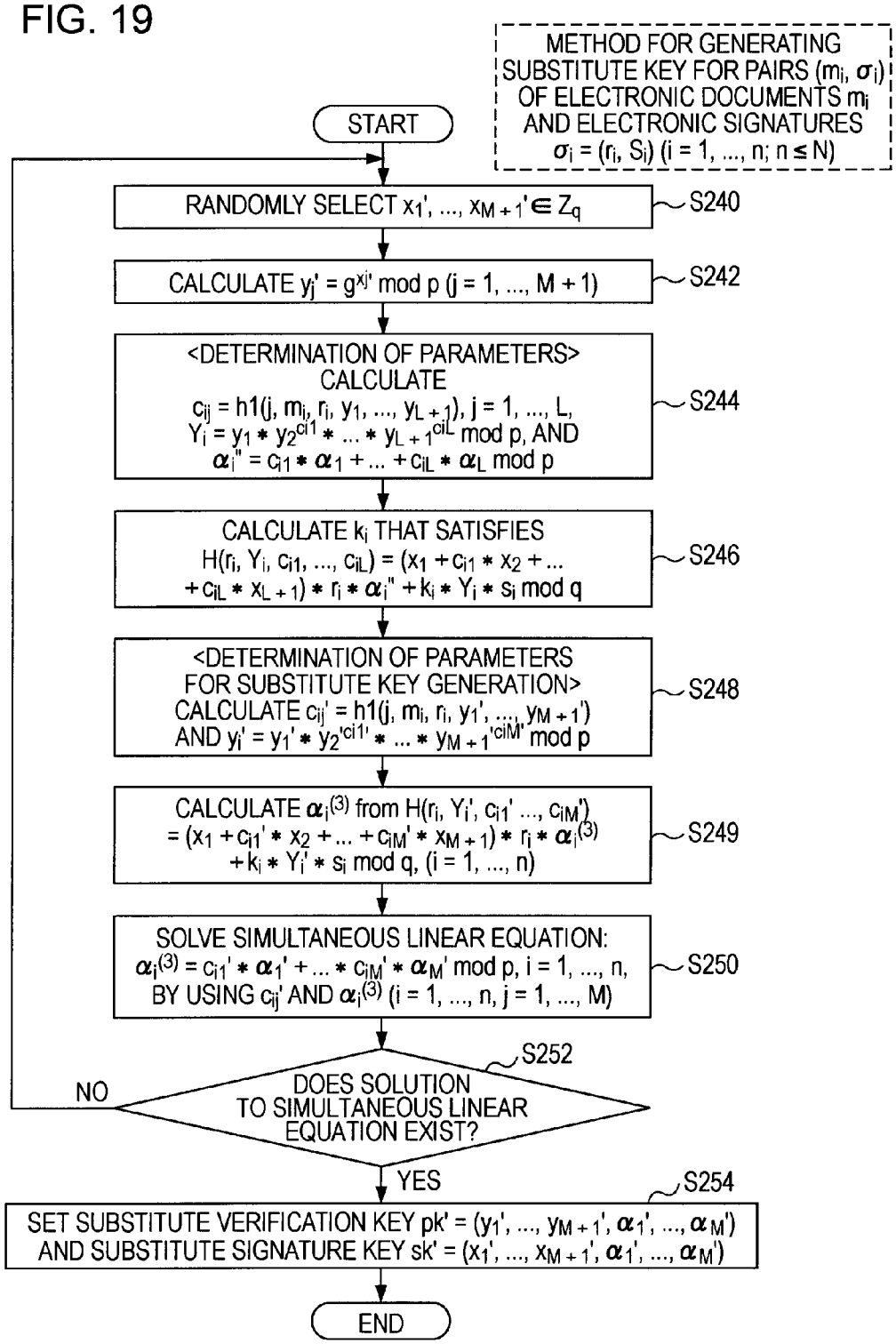
FIG. 19 is a flow diagram illustrating details of a substitute-key generation method according to the extended scheme of the embodiment.

The substitute-key generation algorithm according to the extended scheme will be described next with reference to FIG. 19. FIG. 19 is a flow diagram illustrating one example of specific computations in the substitute-key generation algorithm.

In the substitute-key generation algorithm, first, in step S240, generators $x_1', \ldots, x_{M+1}'$ of $Z_q$ are selected randomly, where M is an integer that satisfies M≧n. In this case, when the verification key and the signature key are to be limited to fixed-length keys, M and L may be equal to each other. Next, in step S242, $y_j'$ (j=1, ..., n+1) is determined as expressed by:

$$y_j' = g^{x_j'} \bmod p, j=1, \ldots, M+1 \quad (65)$$

where $x_1', \ldots, x_{M+1}'$ are parameters to be contained in the substitute signature key sk' and $y_1', \ldots, y_{M+1}'$ are parameters to be contained in the substitute verification key pk'. Next, in step S244, $c_{ij}, Y_i$, and $\alpha_i''$ (i=1, ..., n and j=1, ..., L) are determined based on:

$$c_{ij} = h1(j, m_i, r_i, y_1, \ldots, y_{L+1}), i=1, \ldots, n, j=1, \ldots, L \quad (66)$$

$$Y_i = y_1 \cdot y_2^{c_{i1}} \ldots y_{L+1}^{c_{iL}} \bmod p, i=1, \ldots, n \quad (67)$$

$$\alpha_i'' = c_{i1} \cdot \alpha_1 + \ldots + c_{iL} \cdot \alpha_L \bmod p, i=1, \ldots, n \quad (68)$$

Next, in step S246, the determined $c_{ij}, Y_i$, and $\alpha_i''$ (i=1, ..., n and j=1, ..., L) are used to determine $k_i$ that satisfies:

$$H(r_i, Y_i, c_{i1}, \ldots, c_{iL}) = (x_1 + c_{i1} \cdot x_2 + \ldots + c_{iL} \cdot x_{L+1}) r_i \cdot \alpha_i'' + k_i \cdot Y_i \cdot s_i \bmod q, i=1, \ldots, n \quad (69)$$

where $s_i$ included in equation (69) is a parameter contained in electronic signatures $\sigma_i = (r_i, s_i)$ for n sets of electronic documents $m_i$ and electronic signatures $\sigma_i$ input to the substitute-key generation algorithm. In many cases, the signer does not have the parameter $k_i$. Thus, in this case, the parameter $k_i$ (i=1, n) is recalculated as described above.

Next, in step S248, $c_{ij}'$ (i=1, ..., n and j=1, ..., M) and $y_i'$ (i=1, ..., n) are determined respectively based on:

$$c_{ij}' = h1(j, m_i, r_i, y_1', \ldots, y_{M+1}'), i=1, \ldots, n, j=1, \ldots, M \quad (70)$$

$$Y_i' = y_1' \cdot y_2'^{c_{i1}'} \ldots y_{M+1}'^{c_{iM}'} \bmod p, i=1, \ldots, n \quad (71)$$

Next, in step S249, based on the determined parameter $c_{ij}'$ and $y_i'$ (i=1, ..., n and j=1, ..., M), $\alpha_i^{(3)}$ (i=1, ..., n) is determined so as to satisfy:

$$H(r_i, Y_i', c_{i1}', \ldots, c_{iM}') = (x_1 + c_{i1}' \cdot x_2 + \ldots + c_{iM}' \cdot x_{M+1}) r_i \cdot \alpha_i^{(3)} + k_i \cdot Y_i' \cdot s_i \bmod q, i=1, \ldots, n \quad (72)$$

Next, in step S250, based on the determined parameter $c_{ij}'$ and $\alpha_i^{(3)}$ (i=1, ..., n and j=1, ..., M), $\alpha_1', \ldots \alpha_M'$ are determined so as to satisfy a simultaneous linear equation expressed by:

$$\alpha_i^{(3)} = c_{i1}' \cdot \alpha_1' + \ldots + c_{iM}' \cdot \alpha_M' \bmod p, i=1, \ldots, n \quad (73)$$

In step S252, a determination is made as to whether or not a solution to the simultaneous linear equation expressed by equation (73) exists. When no solution exists, the process returns to the processing in step S240. When a solution exists, the process proceeds to processing in step S254. When the process proceeds to step S254, a substitute verification key pk' and a substitute signature key sk' are set as expressed by:

$$pk' = (y_1', \ldots, y_{M+1}', \alpha_1', \ldots, \alpha_M') \quad (74)$$

$$sk' = (x_1', \ldots, x_{M+1}', \alpha_1', \ldots, \alpha_M') \quad (74)$$

The use of the above-described method makes it possible to generate substitute keys for multiple sets of electronic signatures and electronic documents. As a result, it is also possible to use the substitute keys to update the keys for multiple sets of electronic signatures and electronic documents. The availability of the substitute keys for the multiple sets of electronic signatures and electronic documents also makes it possible to enhance the efficiency of the key update.

[1-6: Hardware Configuration of Terminals]

Figure 20:
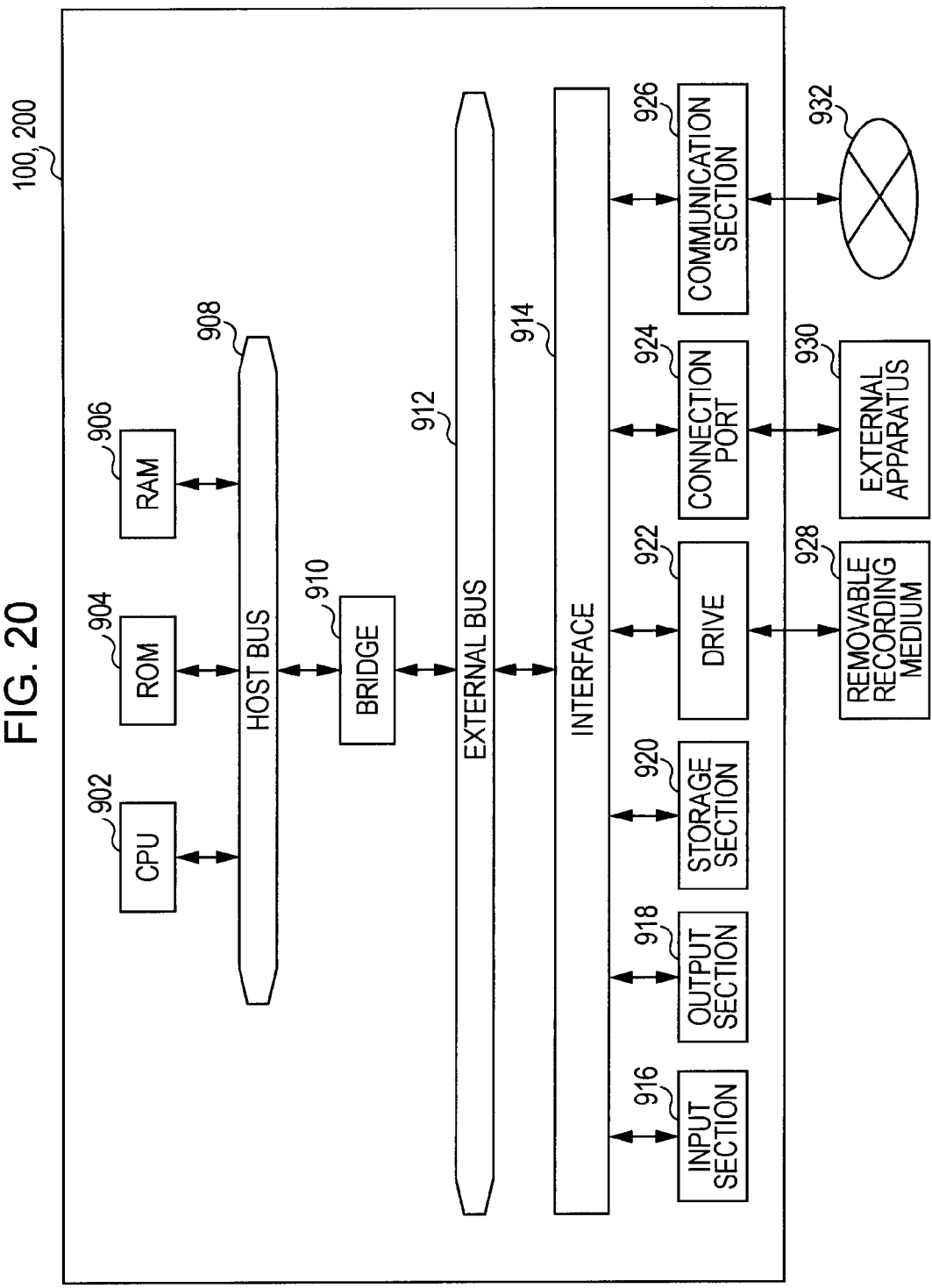
FIG. 20 is a diagram illustrating an example of the hardware configuration of the signer terminal and the verifier terminal according to the embodiment.

The function of the sections included in the signer terminal 100 and the verifier terminal 200 described above can be realized using, for example, the hardware configuration of an information processing apparatus illustrated in FIG. 20. That is, the functions of the individual sections are realized by controlling the hardware, illustrated in FIG. 20, using a compute program. The hardware may take any form, for example, a personal computer, a mobile information terminal (such as a mobile phone, PHS, or PDA), a game console, or a home information appliance. The PHS is an abbreviation of Personal Handyphone System. The PDA is an abbreviation of Personal Digital Assistant.

As illustrated in FIG. 20, the hardware generally has a CPU 902, a ROM 904, a RAM 906, a host bus 908, and a bridge 910. The hardware further has an external bus 912, an interface 914, an input section 916, an output section 918, a storage section 920, a drive 922, a connection port 924, and a communication section 926. The CPU is an abbreviation of Central Processing Unit. The ROM is an abbreviation of Read Only Memory. The RAM is an abbreviation of Random Access Memory.

The CPU 902 serves as a computational processing device or a control device, and controls a partial or entire operation of the individual sections on the basis of various programs stored in the ROM 904, the RAM 906, the storage section 920, or a removable recording medium 928. The ROM 904 serves as means for storing a program to be read to the CPU 902, data used for computation, and so on. The RAM 906 temporarily or permanently stores, for example, a program to be read to the CPU 902 and various parameters that vary as appropriate during execution of the program.

The sections described above are interconnected via, for example, the host bus 908, which can perform high-speed data transfer. The host bus 908 is, in turn, connected to the external bus 912 via, for example, the bridge 910. The data transmission speed of the external bus 912 is relatively low. Examples of the input section 916 include a mouse, a keyboard, a touch panel, a button, a switch, and a lever. A further example of the input section 916 is a remote controller that is capable of transmitting a control signal by utilizing infrared or another type of radio wave.

The output section 918 is implemented by, for example, a display device (such as a CRT device, an LCD, a PDP device, or an ELD), an audio output device (such as a speaker or a headphone), a printer, a mobile phone, and a facsimile machine. That is, the output section 918 serves as means for visually or aurally notifying the user about obtained information. The CRT is an abbreviation of Cathode Ray Tube. The LCD is an abbreviation of Liquid Crystal Display. The PDP is an abbreviation of Plasma Display Panel. The ELD is an abbreviation of Electro-Luminescent Display.

The storage section 920 is a device for storing various types of data. Examples of the storage section 920 include a magnetic storage device (such as a HDD), a semiconductor storage device, an optical storage device, and a magneto-optical storage device. The HDD is an abbreviation of Hard Disk Drive.

The drive 922 is a device for reading information stored in/on the removable recording medium 928 or writing information thereto. Examples of the removable recording medium 928 include a magnetic disk, an optical disk, a magneto-optical disk, and a semiconductor memory. Other specific examples of the removable recording medium 928 include a DVD medium, a Blu-ray medium, an HD DVD medium, and a semiconductor medium. Needless to say, the removable recording medium 928 may be implemented by, for example, an electronic apparatus or an IC card equipped with a contactless IC chip. The IC is an abbreviation of Integrated Circuit.

The connection port 924 is a port for connection with an external apparatus 930 or the like. Examples of the connection port 924 include a USB port, an IEEE (Institute of Electrical and Electronics Engineers) 1394 port, a SCSI port, an RS-232C port, and an optical audio terminal. Examples of the external apparatus 930 include a printer, a mobile music player, a digital camera, a digital video camera, and an IC recorder. The USB is an abbreviation of Universal Serial Bus. The SCSI is an abbreviation of Small Computer System Interface.

The communication section 926 is a communication device for connection with a network 932. Examples of the communication section 926 include a wired or wireless LAN, a Bluetooth® device, and a communication card for a WUSB, a router for optical communication, a router for an ADSL, and a modem for various communications. The network 932 connected to the communication section 926 may be constituted by wired or wirelessly linked networks. Examples include the Internet, a home LAN, an infrared communication link, a visible-light communication link, a broadcast network, and a satellite communication link. The LAN is an abbreviation of Local Area Network. The WUSB is an abbreviation of Wireless USB. The ADSL is an abbreviation of Asymmetric Digital Subscriber Line.

The present application contains subject matter related to that disclosed in Japanese Priority Patent Application JP 2009-112080 filed in the Japan Patent Office on May 1, 2009, the entire content of which is hereby incorporated by reference.

Although a preferred embodiment of the present invention has been described above with reference to the accompanying drawings, it goes without saying that the present invention is not limited to the particular embodiment. It is apparent to those skilled in the art that a variety of variations and modifications can be made to the embodiment within the scope of the appended claims, and naturally, it is to be understood that such changes and modifications are also encompassed by the technical scope of the present invention.

What is claimed is:

1. An information processing apparatus comprising:
a signature generating section that generates an electronic signature $\sigma$ by using a signature key KS associated with a verification key KV; and
a substitute-key generating section that generates, with respect to an electronic document m to which the electronic signature $\sigma$ is attached by the signature generation section, a substitute verification key KV', where KV'≠KV, that is capable of verifying a validity of the electronic signature $\sigma$ and a substitute signature key KS', where KS'≠KS, associated with the substitute verification key KV';
wherein, in a predetermined case, the verification key KV and the signature key KS are updated to the substitute verification key KV' and the substitute signature key KS'
wherein when the signature generating section generates N electronic signatures $\sigma_j$, where j=1, . . . , N, and N≧2, with respect to N electronic documents $m_j$, the substitute-key generating section generates the substitute verification key KV' that is capable of verifying the validity of the electronic signatures with respect to M combinations, where 2≦M≦N, of the N combinations $m_j$ and $\sigma_j$ of the electronic documents and the electronic signatures and the substitute signature key KS' associated with the substitute verification key KV', wherein the information processing apparatus includes a processor and memory.

2. The information processing apparatus according to claim 1, wherein, when the signature key KS is exposed or when a predetermined period passes, the substitute-key generating section generates the substitute verification key KV' and the substitute signature key KS' to update the verification key KV and the signature key KS to the substitute verification key KV' and the substitute signature key KS'.

3. The information processing apparatus according to claim 2, wherein, when the substitute signature key KS' is exposed or when a predetermined period passes, the substitute-key generating section generates a substitute verification key KV''' where KV'''≠KV'and KV'''≠KV, and a substitute signature key KS''', where KS'''≠KS'and KS'''≠KS to update the substitute verification key KV' and the substitute signature key KS' to the substitute verification key KV''' and the substitute signature key KS'''.

4. The information processing apparatus according to claim 1, wherein the substitute-key generating section comprises:
a first-element selector that arbitrarily selects first elements to be contained in the substitute signature key KS';
a second-element determiner that determines second elements to be contained in the substitute verification key KV', by using the first elements;
an element calculator that determines a solution to an equation in which elements contained in a verification equation for verifying the validity of the electronic signature σ by using the verification key KV, the elements being associated with the first and second elements and being contained in the verification key KV and the signature key KS, are replaced with the first and second elements and elements unassociated with the first and second elements and contained in the verification key KV and the signature key KS are unknown; and
a substitute-key determiner that determines the substitute signature key KS' containing at least the first elements selected by the first element selector and the substitute signature key KV' containing at least the second elements selected by the second-element selector and a result of the determination performed by the element calculator.

5. The information processing apparatus according to claim 4, wherein the verification equation is expressed by: $g^u = y^{r^* \alpha} * r^{y^* s}$ mod p where p is a prime number,
where r and s denote two parameters contained in the electronic signature σ, y denotes a parameter regarding the electronic document m and the elements associated with the second elements and contained in the verification key KV, α denotes an element associated with the result of the determination performed by the element calculator and contained in the verification key KV, and u denotes a hash value for the electronic document m and the parameters r and y.

6. A key update method comprising the steps of:
generating an electronic signature σ by using a signature key KS associated with a verification key KV; and
generating, with respect to an electronic document m to which the electronic signature σ is attached by the signature generating step, a substitute verification key KV', where KV'≠KV, that is capable of verifying a validity of the electronic signature σ and a substitute signature key KS', where KS'≠KS, associated with the substitute verification key KV';
updating, in a predetermined case, the verification key KV and the signature key KS to the substitute verification key KV' and the substitute signature key KS' generated by the substitute-key generating function; and
wherein when the signature generating step generates N electronic signatures $\sigma_j$ where j=1, ..., N, and N≧2, with respect to N electronic documents $m_j$, the substitute-key generating step generates the substitute verification key KV' that is capable of verifying the validity of the electronic signatures with respect to M combinations, where 2≦M≦N, of the N combinations $m_j$ and $\sigma_j$ of the electronic documents and the electronic signatures and the substitute signature key KS' associated with the substitute verification key KV';
wherein the method is performed by an information processing apparatus comprising a processor and memory.

7. A non-transitory computer-readable medium encoded with a computer program causing a computer to realize:
a signature generating function that generates an electronic signature σ by using a signature key KS associated with a verification key KV; and
a substitute-key generating function that generates, with respect to an electronic document m to which the electronic signature σ is attached by the signature generation function, a substitute verification key KV', where KV'≠KV, that is capable of verifying a validity of the electronic signature σ and a substitute signature key KS', where KS'≠KS, associated with the substitute verification key KV';
an update function that updates, in a predetermined case, the verification key KV and the signature key KS to the substitute verification key KV' and the substitute signature key KS' generated by the substitute-key generating function; and
wherein when the signature generating function generates N electronic signatures $\sigma_j$, where j=1, ..., N, and N≧2, with respect to N electronic documents $m_j$, the substitute-key generating function generates the substitute verification key KV' that is capable of verifying the validity of the electronic signatures with respect to M combinations, where 2≦M≦N, of the N combinations $m_j$ and $\sigma_j$ of the electronic documents and the electronic signatures and the substitute signature key KS' associated with the substitute verification key KV'.

* * * * *